United States Patent
Maddox et al.

(10) Patent No.: US 12,181,604 B2
(45) Date of Patent: Dec. 31, 2024

(54) WORK VEHICLE PERCEPTION SYSTEMS AND REAR MODULES

(71) Applicant: Deere & Company, Moline, IL (US)

(72) Inventors: Troy K. Maddox, LeClaire, IA (US); Jordan L. Zerr, Cedar Falls, IA (US); Tyler Niday, Santa Cruz, CA (US); Jeffrey E. Runde, Cedar Falls, IA (US); Margaux M. Ascherl, Adel, IA (US)

(73) Assignee: DEERE & COMPANY, Moline, IL (US)

( * ) Notice: Subject to any disclaimer, the term of this patent is extended or adjusted under 35 U.S.C. 154(b) by 397 days.

(21) Appl. No.: 17/466,215

(22) Filed: Sep. 3, 2021

(65) Prior Publication Data

US 2022/0144076 A1  May 12, 2022

Related U.S. Application Data

(60) Provisional application No. 63/111,687, filed on Nov. 10, 2020.

(51) Int. Cl.
| | |
|---|---|
| *G01S 7/48* | (2006.01) |
| *B60R 11/04* | (2006.01) |
| *G01S 7/481* | (2006.01) |
| *G03B 17/55* | (2021.01) |
| *B60R 11/00* | (2006.01) |

(52) U.S. Cl.
CPC .............. *G01S 7/481* (2013.01); *B60R 11/04* (2013.01); *G03B 17/55* (2013.01); *B60R 2011/004* (2013.01)

(58) Field of Classification Search
CPC ... G01S 7/481; B60R 11/04; B60R 2011/004; G03B 17/55; G05D 1/10; G06V 20/56
See application file for complete search history.

(56) References Cited

U.S. PATENT DOCUMENTS

| 3,700,256 A | 10/1972 | Jones, Jr. |
| 5,630,469 A * | 5/1997 | Butterbaugh ......... H01L 23/467 |
| | | 174/16.3 |

(Continued)

FOREIGN PATENT DOCUMENTS

| DE | 102015115883 A1 | 3/2017 |
| DE | 102018217570 A1 | 4/2020 |
| DE | 102019105339 A1 | 9/2020 |
| WO | WO2018156616 A1 | 8/2018 |

OTHER PUBLICATIONS

Extended European Search Report and Written Opinion issued in European Patent Application No. 21203174.4, dated Mar. 24, 2022, in 08 pages.

(Continued)

*Primary Examiner* — Tho V Duong
(74) *Attorney, Agent, or Firm* — KLINTWORTH & ROZENBLAT IP LLP

(57) ABSTRACT

A rear perception module is utilized in conjunction with a work vehicle having a work vehicle cabin and a cabin roof. In an embodiment, the rear perception module includes an environmental depth perception (EDP) sensor system including a first EDP device having a field of view encompassing an environmental region to a rear of the work vehicle, a rear module housing mounted to an upper trailing edge portion of the cabin roof, and vents formed in exterior walls of the rear module housing to facilitate airflow through the rear module housing along a cooling airflow path. A heat-generating electronic component is electrically coupled to the first EDP device and positioned in or adjacent the cooling airflow path such that excess heat generated by the heat-generating electronic component is dissipated by convective transfer to airflow conducted along the cooling airflow path during operation of the rear perception module.

13 Claims, 12 Drawing Sheets

(56) References Cited

U.S. PATENT DOCUMENTS

| | | | |
|---|---|---|---|
| 10,875,589 | B2 | 12/2020 | Letscher et al. |
| 11,315,258 | B1 | 4/2022 | Anagnostopoulos |
| 2017/0046578 | A1 | 2/2017 | Phillips |
| 2018/0127027 | A1 | 5/2018 | Brennan et al. |
| 2018/0188032 | A1* | 7/2018 | Ramanandan .......... G01S 19/52 |
| 2019/0154799 | A1* | 5/2019 | Schmidt .................. G01S 17/42 |
| 2019/0204845 | A1 | 7/2019 | Grossman et al. |
| 2019/0317521 | A1 | 10/2019 | Nishi et al. |
| 2020/0077540 | A1 | 3/2020 | Yen et al. |
| 2020/0077564 | A1 | 3/2020 | Boydens et al. |
| 2020/0386860 | A1* | 12/2020 | Chung .................. G01S 7/4813 |
| 2021/0016286 | A1 | 1/2021 | Swanson et al. |
| 2021/0024144 | A1 | 1/2021 | Patnaik et al. |
| 2021/0034867 | A1 | 2/2021 | Ferrari et al. |
| 2021/0153420 | A1 | 5/2021 | Smith |
| 2021/0181737 | A1 | 6/2021 | Patnaik et al. |
| 2021/0201528 | A1 | 7/2021 | Yuasa |
| 2021/0339699 | A1 | 11/2021 | Adams et al. |
| 2021/0383269 | A1 | 12/2021 | Zhou et al. |
| 2021/0383318 | A1 | 12/2021 | Patnaik et al. |
| 2022/0043157 | A1 | 2/2022 | Chen et al. |
| 2022/0078314 | A1 | 3/2022 | Roth et al. |
| 2023/0379593 | A1 | 11/2023 | Nie |

OTHER PUBLICATIONS

Extended European Search Report and Written Opinion issued in European Patent Application No. 21203178.5, dated Mar. 17, 2022, in 13 pages.

John Deere, The Future of Farming Technology, https://www.deere.co.uk/en/agriculture/future-of-farming/, undated, admitted prior art (6 pages).

Case IH Unveils Autonomous Concept Tractor, https://www.agriculture.com/news/machinery/case-ih-unveils-autonomous-concept-tractor, Aug. 31, 2016 (8 pages).

New Holland, The Future of Agriculture Could Rest With Self Driving Tractors, New Holland's Autonomous Concept Tractor—https://www.forbes.com/sites/jenniferhicks/2016/08/30/the-future-of-agriculture-could-rest-with-self-driving-tractors/?sh=6bdd0c13559a, 2016 (3 pages).

Smart AG, Plowing AI, Startup Retrofits Tractors with Autonomy—https://blogs.nvidia.com/blog/2019/05/21/smart-ag-retrofits-tractors-with-ai-jetson-autonomy/, May 21, 2019 (11 pages).

Waymo, Introducing Waymo's Suite of Custom-Built, Self-Driving Hardware, https://blog.waymo.com/2019/08/introducing-waymos-suite-of-custom.html, Waypoint—The Official Waymo Blog, Feb. 15, 2017 (6 pages).

Tesla Backup Cameras, Reverse Engineered: Sony CIS Inside Denso Automotive Camera, Tesla Model 3 Triple Camera, Samsung Galaxy Note 10+ ToF Camera, http://www.f4news.com/2020/01/21/reverse-engineered-sony-cis-inside-denso-automotive-camera-tesla-model-3-triple-camera-samsung-galaxy-note-10-tof-camera/, Jan. 21, 2020 (4 pages).

IVT International, John Deere Offers Holistic Future Vision at Agritechnica—Including 'VoloDrone' Sprayer, https://www.ivtinternational.com/news/agriculture/john-deere-rocking-the-future-at-agritechnica.html, Nov. 12, 2019 (4 pages).

Youtube, The Best John Deere Innovation 2019/2020 - TractorLab, Autonomous Tractor Future of Farming, https://www.youtube.com/watch?v=idc0G8YQBZA, 2019-2020 (2 pages).

* cited by examiner

WORK VEHICLE PERCEPTION SYSTEMS AND REAR MODULES

CROSS-REFERENCE TO RELATED APPLICATION(S)

This application claims priority to U.S. provisional application Ser. No. 63/111,687, filed with the United Stated Patent and Trademark Office on Nov. 10, 2020.

STATEMENT OF FEDERALLY SPONSORED RESEARCH OR DEVELOPMENT

Not applicable.

FIELD OF THE DISCLOSURE

This disclosure relates to work vehicle perception modules providing various advantages, including thermal performance and structural integration benefits, as well as to work vehicle perception systems containing such modules.

BACKGROUND OF THE DISCLOSURE

As appearing herein, the term "work vehicle perception module" refers to a structural assembly containing one or more environmental depth perception (EDP) devices, which are configured to monitor three dimensional (3D) characteristics of a work vehicle's external environmental. The data gathered by the EDP devices within a work vehicle perception module may be utilized to support, for example, navigation, obstacle detection, or environment mapping functions. Examples of such EDP devices include radar, lidar, and sonar-based sensors, with lidar-based sensors commonly utilized in the context of work vehicle perception systems. In certain cases, stereoscopic camera assemblies are employed as vision-based EDP devices, which enable environmental depth assessment by correlating imagery contained within video feeds captured by twin cameras spaced by a fixed distance. Relative to other types of EDP devices, stereoscopic camera assemblies may provide higher resolutions and other advantages, which render stereoscopic camera assemblies particularly well-suited for usage in autonomous and semi-autonomous work vehicle applications. These benefits notwithstanding, EDP sensors systems incorporating stereoscopic camera assemblies encounter certain unique technical challenges, such as high visual processing demands and associated thermal dissipation constraints, which existing work vehicle integration schemes fail to address in an adequate or comprehensive sense. An ongoing industrial needs thus persists for improved manners by which work vehicles can be equipped with EDP systems, such as vision-based EDP systems including stereoscopic camera assemblies.

SUMMARY OF THE DISCLOSURE

Embodiments of a rear perception module are disclosed and utilized in conjunction with a work vehicle including a work vehicle cabin and a cabin roof. In implementations, the rear perception module includes an environmental depth perception (EDP) sensor system including a first EDP device having a field of view encompassing an environmental region to a rear of the work vehicle, a rear module housing mounted to an upper trailing edge portion of the cabin roof, and vents formed in exterior walls of the rear module housing to facilitate airflow through the rear module housing along a cooling airflow path. A heat-generating electronic component is electrically coupled to the first EDP device and positioned in or adjacent the cooling airflow path such that excess heat generated by the heat-generating electronic component is dissipated by convective transfer to airflow conducted along the cooling airflow path during operation of the rear perception module.

Embodiments of a work vehicle equipped with a rear perception module are further disclosed. In an example embodiment, the work vehicle includes a work vehicle cabin and a cabin roof, which has a first trailing corner region, a second trailing corner region, and a central trailing edge region between the first trailing corner region and the second trailing corner region. The rear perception module includes, in turn, a rear module housing mounted to the cabin roof, a first laterally-looking stereoscopic camera assembly contained in the rear module housing and positioned adjacent the first trailing corner region of the cabin roof, a second laterally-looking stereoscopic camera assembly contained in the rear module housing and positioned adjacent the second trailing corner region of the cabin roof, and a rearwardly-looking stereoscopic camera assembly contained in the rear module housing and positioned adjacent the central trailing edge region of the cabin roof.

The details of one or more embodiments are set-forth in the accompanying drawings and the description below. Other features and advantages will become apparent from the description, the drawings, and the claims.

BRIEF DESCRIPTION OF THE DRAWINGS

At least one example of the present disclosure will hereinafter be described in conjunction with the following figures.

Figure 1:
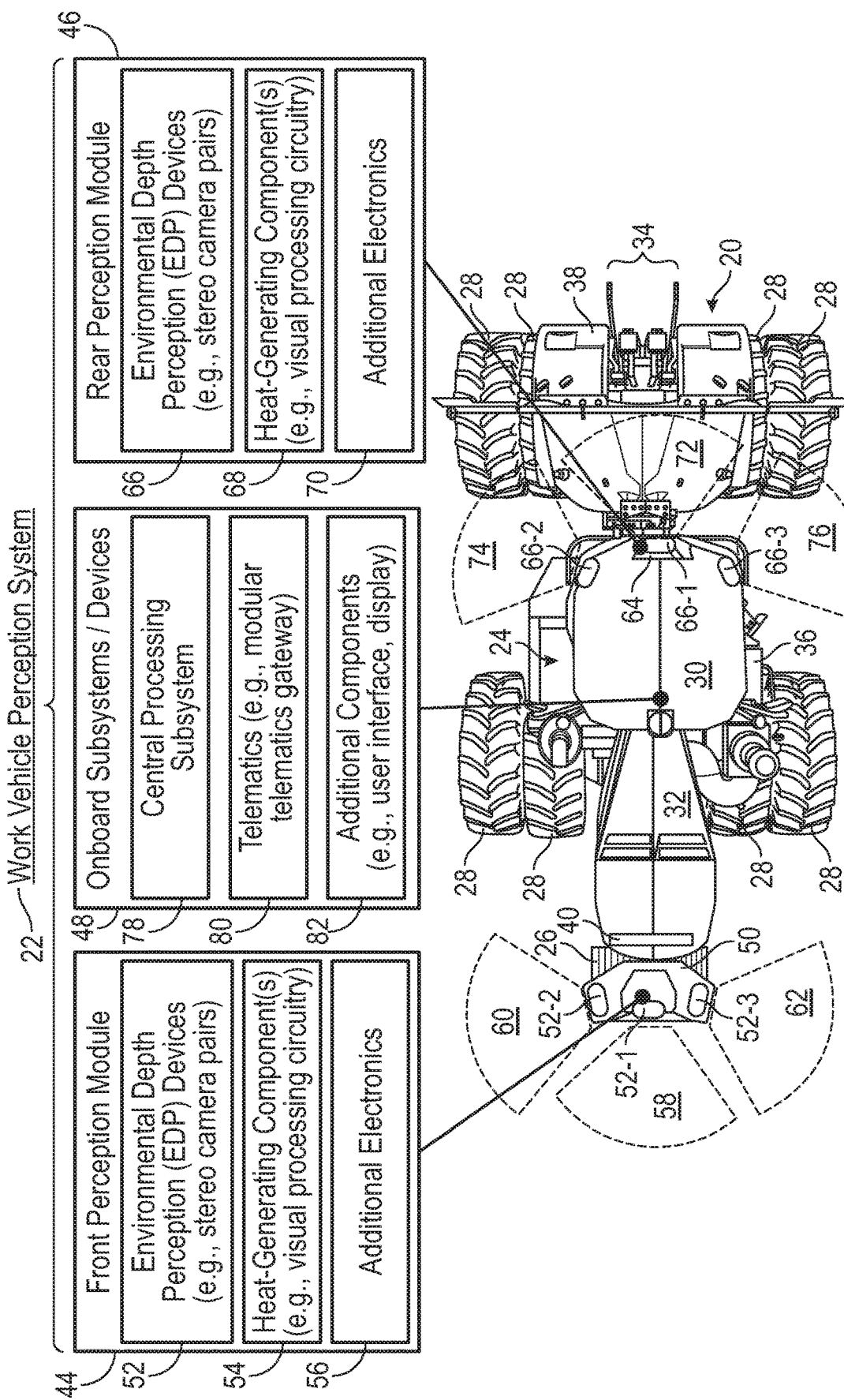
FIG. 1 illustrates a work vehicle (a tractor shown in top view) equipped with a work vehicle perception system (shown as a schematic) including front and rear perception modules, as presented in accordance with an example embodiment of the present disclosure.

Like reference symbols in the various drawings indicate like elements. For simplicity and clarity of illustration, descriptions and details of well-known features and techniques may be omitted to avoid unnecessarily obscuring the example and non-limiting embodiments of the invention described in the subsequent Detailed Description. It should further be understood that features or elements appearing in the accompanying figures are not necessarily drawn to scale unless otherwise stated.

DETAILED DESCRIPTION

Embodiments of the present disclosure are shown in the accompanying figures of the drawings described briefly above. Various modifications to the example embodiments may be contemplated by one of skill in the art without departing from the scope of the present invention, as set-forth the appended claims. As appearing herein, the term "module" refers generally to a system or electronics-containing assembly adapted for installation on a tractor or other work vehicle.

Overview

The following describes front and rear work vehicle perception modules for usage in conjunction with tractors and other work vehicles, such work vehicles equipped with front ballast systems and/or work vehicles capable of autonomous (or semi-autonomous) operation. The front and rear work vehicle perception modules provide certain structural integration, mechanical protection, and thermal performance advantages, as described throughout this document. The below-described work vehicle perception modules are consequently well-suited for usage in conjunction with environmental depth perception (EDP) sensor systems, which often contain electronic (e.g., processing) components prone to excess heat generation during system operation. In this regard, embodiments of the front and rear work vehicle perception modules are beneficially utilized to deploy EDP sensor systems containing EDP sensors or devices, which monitor the three dimensional (3D) spatial characteristics of a work vehicle's exterior environment to support any number and type of functions, such as navigation, obstacle detection, and/or spatial mapping functions. Further, embodiments of the front and rear work vehicle perception modules may be particularly well-suited for usage in conjunction with vision-based EDP sensor systems, which contain EDP devices in the form of stereoscopic camera assemblies and associated visual processing circuitry (e.g., VPUs) subject to high processing demands and prone to excess heat during module operation.

Discussing first the front perception module in greater detail, embodiments of the front perception module may be mounted to the chassis of a tractor or other work vehicle at a location adjacent a front ballast system. For example, in at least some embodiments, the front perception module may be mounted to the work vehicle chassis through the front ballast system and, in at least some instances, may be rigidly or fixedly joined to a laterally-extending hanger bracket included in the front ballast system. In various implementations, the front perception module includes a front module housing containing an EDP sensor system, with the front module housing rigidly mounted or joined to the laterally-extending hanger bracket through a base structure or "mounting base." The front module housing may be positioned, dimensioned, and shaped to extend substantially parallel to the laterally-extending hanger bracket at an elevation above the hanger bracket, thereby accommodating the manual positioning of removable ballast weights beneath the front module housing. In certain implementations, at least some portion, if not the entirety of the mounting base may be integrally formed with the laterally-extending hanger bracket as, for example, a single (e.g., cast) piece or unitary structure. In this case, the upper surface of the mounting base may define a platform or mounting surface on which the front module housing may seat and to which the front module housing may be secured; e.g., by attachment with bolts or other fasteners.

In other instances, the mounting base may be separately fabricated and structurally configured (sized and shaped) to engage into the laterally-extending hanger bracket to allow attachment of the front perception module via retrofit installation. For example, in this latter instance, the mounting base may be fabricated to include one or more mounting flanges, which extend from the front module housing in a downward direction to engage or hook into the laterally-extending hanger bracket. In such implementations, the mounting flanges may be imparted with C-shaped geometries, as viewed from a side of the front perception module, and include slots opening toward the laterally-extending hanger bracket when the front perception module is properly oriented with respect to the front ballast system of the work vehicle. Further, the flange slots may be shaped and dimensioned to enable mating or close-fit installation of the mounting base onto the laterally-extending hanger bracket; e.g., by fitting the mounting flanges into engagement with the hanger bracket and subsequently securing the flanges in their desired position utilizing fasteners, by welding, or via another attachment technique. In still other instances, the mounting base may include features, such as railing or an attachment bracket, which extends downwardly from a support platform to connect to the work vehicle chassis, whether in a direct manner or through the front ballast system. In such embodiments, the housing of the front perception module may be mounted to the support platform, which may be positioned at an elevation above the laterally-extending hanger bracket to allow the positioning of removable ballast weights beneath the support platform and the front module housing when the ballast weights are loaded onto the laterally-extending hanger bracket. In still further implementations, the front perception module may be mounted to the mounted to the front ballast system, or mounted directly to a work vehicle chassis positioned immediately above the front ballast system, in various other manners as described below.

When applicable, joinder of the front perception module to the laterally-extending hanger bracket of a front ballast system (whether by direct integration, by retrofit installation, or otherwise by fixedly attaching the front module housing to the hanger bracket in some manner) provides several advantages, including the provision of a rigid attachment of the front module housing to the work vehicle chassis. Such a rigid mounting scheme minimizes vibrational disturbances otherwise be transmitted to the module sensors or EDP devices (e.g., stereoscopic camera assemblies) contained in EDP sensor system to improve sensor performance during work vehicle operation and travel of the work vehicle over rough terrain. Additional benefits may include positioning of the module sensors (EDP devices) at a generally optimal ground height or vertical elevation to minimize exposure of the front perception module to dust and debris, at a forward-most point of the work vehicle (as particularly beneficial when the front perception module contains one or more stereoscopic camera assemblies), and at location providing little to no (nominal) obstruction of operator sightlines when a human operator is present within the work vehicle cabin.

In embodiments, joinder of the front perception module to the front ballast system further affords robust mechanical protection to the front perception module in embodiments by, for example, recessing the leading edges of the front module housing relative to the leading edges of the front ballast system; and/or recessing the side edges of the front module housing relative to the side edges of the hanger bracket. The likelihood of damage to the EDP sensor system, which often contains relatively sensitive and costly componentry, is consequently minimized in the unlikely event of collision with an object located forward of the work vehicle. Finally, as a still further benefit, joinder of the front perception module to the front ballast system enables positioning of the EDP sensors or devices in a manner providing a broad angle cumulative sensor FOV; e.g., in embodiments, a cumulative sensor FOV approaching or exceeding 180° can be achieved by, for example, strategically positioning multiple (e.g., three) stereoscopic camera pairs (or other EDP devices) about an inner periphery of the front module housing, as described below.

Embodiments of the below-described front perception module provide thermal performance or heat dissipation benefits, as well. To this end, the front perception module may incorporate features facilitating airflow through the front module housing along one or more cooling airflow paths as the work vehicle remains stationary or travels in a forward direction. The internal layout or architecture of the front perception module and the routing of such cooling airflow paths may be designed such that airflow conducted along the cooling airflow paths impinges one or more heat-generating electronic components within the front perception module (e.g., a VPU or other visual processing circuitry prone to excess heat generation) to boost the heat rejection capabilities of the front perception module, optimizing the operation and prolonging the lifespan of the EDP sensor system. Such airflow enhancement features can include, for example, airflow vents for receiving and exhausting ram airflow during work vehicle forward motion or in the presence of headwinds, as well as certain vertical duct features (e.g., the below-described convective chimney) promoting passive cooling airflow through the front perception module in an essentially upward or vertical direction. Additionally, positioning of the front perception module, and corresponding airflow enhancement features of the front perception module, may leverage positioning of the front module housing adjacent the forward radiator fan of the work vehicle. As airflow is actively drawn into the radiator section of the work vehicle by action of the radiator fan to convectively cool the work vehicle radiator or heat exchanger, a fraction of the forced airflow is initially drawn through the front module housing to further increase the overall thermal performance characteristics or heat rejection capabilities of the front perception module. In the aggregate, such features may enable the front perception module to provide robust heat dissipation capabilities, while lacking any fans, liquid coolant circulation features, or other active cooling devices for increased durability, part count reduction, and overall cost savings of the front perception module.

Discussing next the rear perception module in greater detail, when present within the work vehicle perception system, this module may be joined to (e.g., integrated into) or otherwise positioned adjacent a trailing edge portion of the work vehicle cabin roof. Several benefits may be achieved by mounting the rear perception module to or adjacent (e.g., immediately beneath) the trailing edge portion of the work vehicle cabin. Such benefits may include nominal obstruction of operator sightlines through the cabin windows, damage protection due to the elevated nature of this mounting location, access to clean (debris-free) air for cooling purposes, spatial offset from the work vehicle hitch (if present), and sufficient EDP device elevation to provide sensor sightlines over and around various implements or machines that may be towed by the host work vehicle, such as a tractor, at different junctures in time. Further, in at least some implementations, the rear module housing of the rear perception module may be dimensioned to span the width of the trailing portion of the work vehicle cabin roof to provide lateral mounting locations for at least two stereoscopic camera assemblies (or other EDP devices) in addition to a central rear mounting location for a central stereoscopic camera assembly (or analogous EDP device). Collectively, such a mounting arrangement may provide the stereoscopic camera assemblies (or other EDP devices) of the rear perception module with a relatively expansive or broad, rear-centered FOV, again approaching or exceeding 180° in embodiments. Therefore, when combined with the front perception module, a cumulative FOV of essentially 360° can be achieved to provide comprehensive sensor coverage of the environment surrounding a given work vehicle.

As do embodiments of the front perception module, embodiments of the rear perception module may also include strategically-positioned vents and similar airflow enhancement features promoting airflow through the rear perception module along one or more cooling airflow paths. By directing airflow through the rear module housing, and by designing the internal layout or architecture of the rear perception module to position heat-generating electronic components in or adjacent the cooling airflow paths, an efficient cooling scheme is provided for dissipating excess heat generated by the heat-generating electronic component(s) contained in rear module housing. Such heat-generating electronic components may include, for example, a VPU or visual processing circuitry contained in the rear module housing and electrically coupled to the EDP devices in the form of a plurality of stereoscopic camera assemblies. The vents of the rear perception module may include one or more ram airflow vents promoting the intake of cooling airflow into the interior of the rear module housing during forward travel of the work vehicle. Further, in at least some embodiments, the rear perception module may include a lower trailing portion, which protrudes beyond the rear work vehicle window in an aft or reward direction and which is vented to promote air intake into the rear perception module rising in a generally upward direction alongside a rear window of the work vehicle cabin. Additionally or alternatively, venting may be provided along a topside or upper panel of the front perception module and along a bottomside of the rear perception module to promote outflow of cooling airflow in a generally vertical direction through a portion of rear perception module (e.g., a central housing section) containing a VPU assembly and/or other electronics prone to excess heat generation. Thus, once again, highly efficient heat dissipation schemes are provided to convectively cool heat-generating electronic components contained within the rear perception module for enhanced thermal performance, including in the absence of fans or other active cooling mechanisms. The performance of the housed EDP sensor (e.g., stereoscopic camera) systems may be optimized as a result, while the overcall complexity, cost, and part count of the rear perception module is minimized.

Examples of front and rear perception modules contained in a work vehicle perception system will now be described in conjunction with a particular type of work vehicle (a tractor), as illustrated and discussed below in connection with FIGS. 1 and 2. Additional description of the example front module assembly is further set-forth below in connection with FIGS. 3-6, while further discussion of the example rear module assembly is provided below in connection with FIGS. 7-10. Finally, a second example embodiment of a rear perception module included in a work vehicle perception system deployed onboard a tractor is set-forth below in connection with FIGS. 11 and 12. While described below in connection with a particular tractor, embodiments of the front perception module and/or the rear perception module can be utilized in conjunction with various different types of work vehicles (including other tractor platforms), whether such work vehicles are principally employed in the agricultural, construction, forestry, or mining industries, or another industrial context. Further, while the front perception module and the rear perception module are beneficially utilized in combination to, for example, provide a complete 360° cumulative FOV for EDP devices (e.g., stereoscopic camera assemblies) housed within the perception modules, the front perception module and the rear perception module can be deployed individually (in isolation) in at least some embodiments of the present disclosure. The following description is provided by way of non-limiting illustration only and should not be construed to unduly restrict the scope of the appended Claims in any manner.

Example Work Vehicle Perception System including Front and Rear Perception Modules Referring initially to FIG. 1, a work vehicle 20 is equipped with a work vehicle perception system 22, as depicted in accordance with an example embodiment of the present disclosure. In the illustrated example, the work vehicle 20 assumes the form of an agricultural tractor. Accordingly, the work vehicle 20 and the work vehicle perception system 22 are specifically referred to below as a "tractor 20" and a "tractor perception system 22," respectively. The present example notwithstanding, embodiments of the work vehicle perception system 22 can be deployed onboard other types of work vehicles in alternative implementations, particularly other work vehicles equipped with front ballast systems similar or substantially identical to the below-described front ballast system 26 and utilized with removal ballast weights.

In addition to the tractor perception system 22, the example tractor 20 includes a mainframe or chassis 24, a front ballast system 26 rigidly joined to a forward end of the tractor chassis 24, and a number of ground-engaging wheels 28 supporting the tractor chassis 24. A cabin 30 is located atop the tractor chassis 24 and encloses an operator station in which an operator may reside when manually piloting the tractor 20. An engine compartment, which is partially enclosed by a tractor hood 32, is situated forward of the tractor cabin 30; and a rear hitch 34, associated with any number of hydraulic, pneumatic, or electrical couplings, is situated aft or rearward of the tractor cabin 30. In this particular example, the tractor chassis 24 has an articulable chassis design and such a forward chassis section 36 is able to pivot or swivel relative to a rear chassis section 38 about a vertical hinge line, which generally extends orthogonal to the plane of the page in FIG. 1. Located at a frontmost point of the tractor 20, the front ballast system 26 enables a number of modular weights (herein, "removable ballast weights") to be loaded onto and removed from a support structure joined to the tractor chassis 24. By adding or removing ballast weights in this manner, an operator can vary the cumulative mass acting on the front of the tractor 20 in selected increments when, for example, the tractor 20 is utilized to tow any one or more implements and traction at the ground-engaging wheels 28 (or tracks) is desirably boosted. Further description of the front ballast system 26 is provided below in connection with FIG. 2.

The example tractor 20 may be operable in a semi-autonomous mode, a fully autonomous mode, or both. When capable of fully autonomous operation, the tractor 20 may nonetheless be produced to include a tractor cabin, such as the illustrated cabin 30, enclosing a manual operator station (including a seat, one or more displays, and various pilot controls) to allow manual operation of the tractor 20 when so desired. In addition to components supporting manual tractor operation, the example tractor 20 further includes various other components, devices, and subsystems commonly deployed onboard tractors and other work vehicles. Such components can include, for example, a radiator fan 40 positioned in a forward portion of the engine compartment adjacent a front grille 42 of the tractor 20 (labeled in FIG. 2). When active, the radiator fan 40 draws airflow through the front grille 42 and across a non-illustrated radiator or heat exchanger, which is housed within the engine compartment of the tractor 20. Liquid coolant is exchanged between the radiator and an internal combustion engine, such as a heavy duty diesel engine, further housed within the tractor engine compartment. Some fraction of the excess heat generated during engine operation is thus transferred to the surrounding ambient environment via convective transfer to the airflow impinging the fins or other exterior surfaces of the radiator by action of the radiator fan 40 in the well-known manner.

With continued reference to FIG. 1, the tractor perception system 22, includes a front perception module 44, a rear perception module 46, and a number of complementary onboard subsystems or devices 48 for collecting data from or otherwise exchanging data with the modules 44, 46; processing such data; and performing associated actions when, for example, the tractor 20 is engaged in autonomous operation, is remotely piloted by a human operator, or is manually piloted by a human operator located within the cabin 30. In the illustrated example, the front perception module 44 includes a front module housing 50 containing a number of perception sensors or EDP devices 52, one or more heat-generating electronic components 54, and any number and type of additional electrical components 56. As indicated above, the EDP devices 52 can be any devices or sensors suitable for collecting depth information pertaining to the external environment of the tractor 20 for navigational, obstacle detection, environment mapping, or other purposes. Examples of sensor types suitable for usage as the EDP devices 52 include radar, lidar, and sonar-based sensors, which emit energy pulses and measure pulse reflections utilizing transducer arrays to estimate the proximity of various objects and surfaces located within the surrounding environment of the tractor 20. While the EDP devices 52 can assume various different forms (and combinations of different sensor types), embodiments of the front perception module 44 may be particularly well-suited usage in conjunction with stereoscopic camera assemblies for reasons discussed below. Accordingly, and by way of non-limiting example only, the front perception module 44 is principally described as containing stereoscopic camera assemblies or "stereo camera pairs," as is the rear perception module 46. Collectively, the EDP devices 52, and the heat-generating electronic components 54, and any additional electronics housed within the front perception module 44 form an EDP sensor system 52, 54, 56.

When present, the heat-generating electronic component or components 54 contained within the front perception module 44 may assume the form of processing components, such as printed circuit boards (PCBs) or cards populated by integrated circuit (IC) dies and other circuit elements, such as discrete capacitors, resistors, or inductors realized as Surface Mount Devices (SMDs). For example, when the EDP devices 52 assume the form of one or more stereoscopic camera assemblies, the heat-generating electronic components 54 can include or may consist of a visual process circuitry electrically coupled to the stereoscopic camera assemblies for performing certain image processing tasks, such as pixel correlation of the twin video feeds supplied by the cameras in each stereoscopic camera assembly to assess image depth measurements utilizing the video feeds captured by the stereo cameras. In embodiments, such visual processing circuitry may be realized in the form of a VPU or VPU-containing assembly, such as the example VPU assembly discussed below in connection with FIG. 13. As appearing herein, the term "VPU" is defined in a broad or comprehensive sense to generally encompass processing units or electronic modules adapted to provide video feed processing tasks. The term "VPU" encompasses the term "graphic processing unit" or "GPU," as defined herein. VPUs, and similar visual processing components commonly engaged in dynamic, high load processing tasks and potentially containing dense logic gate arrays and neural networks, are commonly prone to excess heat generation; and, thus, may benefit from efficient thermal dissipation reducing or eliminating excessive heat accumulation or "hot spots" within such logic or processing structures. For at least this reason, the front perception module 44 is advantageously produced to include heat dissipation features promoting efficient heat removal or extraction from such heat-generating electronic components 54 by, for example, facilitating passive heat transfer to cooling airflow streams conducted along volumetrically robust, low resistance flow paths provided through the front module housing 50. Additional description in this regard is provided below in connection with FIGS. 2-6.

Embodiments of the front perception module 44 may include any number and type of additional electronic components 56, which are contained within the front module housing 50 which may or may not be electrically coupled to the EDP devices 52 and the heat-generating electronic component or components 54. Such additional electronic components 56 can include various processing components and other sensor types. Examples of such additional sensors that may be further contained in the front perception module 44 include microelectromechanical systems (MEMS) accelerometers, MEMS gyroscopes, and other inertial measurement sensors, as well as sensors for monitoring the health of the front EDP sensor system 52, 54, 56. It is also possible to pair or combine multiple types of EDP devices 52, such as one or more lidar sensors utilized in conjunction with stereoscopic camera assemblies, in at least some embodiments of the front perception module 44. Additionally or alternatively, such auxiliary or additional electronic components 56 can include lighting devices, which emit light in visible or non-visible portions of the electromagnetic (EM) spectrum to enhance operation of the EDP devices 52 in low light or other poor visibility conditions.

Regardless of the particular type of EDP devices housed within the front module housing 50, the EDP devices 52 are beneficially positioned such that the respective FOVs of the EDP devices 52 are angularly spaced or distributed about the forward and lateral sides of the module housing 50. For example, as indicated in FIG. 1, three EDP devices 52-1, 52-2, 52-3 may be contained within the front perception module 44 having individual FOVs 58, 60, 62, respectively. In the illustrated embodiment, this includes a forward-looking stereoscopic camera assembly 52-1 having a forward-centered FOV 58 extending from the front perception module 44 in principally a forward direction; a first lateral-looking stereoscopic camera assembly 52-2 having an FOV 60 extending from the front perception module 44 in a first lateral direction and perhaps angled forward of the tractor 20 to some degree; and a second lateral-looking stereoscopic camera assembly 52-3 having an FOV 60 extending from the front perception module 44 in a second lateral direction opposite the first lateral direction. Collectively, the FOVs 58, 60, 62 cooperate to provide a cumulative forward-centered FOV approaching, if not exceeding 180° to provide relatively full or comprehensive coverage of the environmental regions to the forward, forward-right (from an operator's perspective), and forward-left (from an operator's perspective) regions of the tractor 20. In other embodiments, the front perception module 44 can include a greater or lesser number of the perception sensors or EDP devices depending upon, for example, the desired cumulative angular coverage range of the sensors, the individual FOV angle of each of the perception sensors, packaging constraints, and other such factors.

As does the front perception module 44, the rear perception module 46 of the work vehicle perception system 22 includes a rear module housing 64 containing one or more perception sensors or EDP devices 66, at least one heat-generating electronic component 68, and any number and type of additional electronic components 70. Collectively, the EDP devices 66, the heat-generating electronic components 68, and the additional electronics 70 (if included) form a rear EDP sensor system 66, 68, 70. The heat-generating electronic component 68 will often assume the visual processing circuitry or devices, such as a VPU when the rear EDP devices 66 assume the form of stereoscopic camera assemblies; however, the possibility that such visual processing circuitry (when present) may be externally located relative to the rear module housing 64 is not precluded. The additional electronics 70 can include various sensors in addition to the EDP devices 66; lighting devices operable in the visible or non-visible portions of the EM spectrum for enhancing operation of the EDP devices 66 when appropriate; MEMS gyroscopes, accelerometers, magnetometers, and similar devices potentially packaged as an Inertial Measurement Unit (IMU); beacon lights; and wireless (e.g., radio frequency) receivers, to list but a few examples. It is also possible to pair or combine a first type of EDP device (e.g., stereoscopic camera assemblies) with a second type of EDP device (e.g., lidar sensors) in at least some embodiments of the rear perception module 46, as previously noted.

The perception sensors or EDP devices 66 contained within the rear module housing 64 can assume various forms suitable for monitoring the spatial environment to the rear and lateral-rear of the tractor 20, examples of which have been previously mentioned. In the illustrated example, three EDP devices 66-1, 66-2, 66-3 are contained within the rear perception module 46 and possess individual sensor FOVs 72, 74, 76, respectively. Specifically, in the illustrated embodiment and by way of non-limiting example, the EDP devices 66-1, 66-2, 66-3 include a rear-looking stereoscopic camera assembly 66-1 having an FOV 72 extending from the rear perception module 46 in principally a rearward direction; a first rear-lateral-looking stereoscopic camera assembly 66-2 having an FOV 74 extending from the rear perception module 46 in the rearward direction and a first lateral direction; and a second rear-lateral-looking stereoscopic camera assembly 66-3 having an FOV 76 extending from the rear perception module 46 in the rearward direction and a second lateral direction opposite the first lateral direction.

The respective FOVs 72, 74, 76 of the stereoscopic camera assemblies 66-1, 66-2, 66-3 collectively form a combined or cumulative FOV approaching, if not exceeding 180°. Such a cumulative sensor FOV provides broad coverage of the environmental regions to the rear, rear-right (from the perspective of an operator seated within the cabin 30), and rear-left (from the operator's perspective) regions of the tractor 20. Further, in combination, the stereoscopic camera assemblies 52-1, 52-2, 52-3 contained in the front perception module 44 and the stereoscopic camera assemblies 66-1, 66-2, 66-3 contained in the rear perception module 46 provide the tractor perception system 22 with a complete or full 360° view of the external environment surrounding the tractor 20, thereby ensuring adequate sensor coverage to support autonomous or semiautonomous operation of the tractor 20 in at least some instances. As discussed more fully below in connection with FIGS. 7-10, the rear perception module 46 may be positioned adjacent (e.g., located immediately beneath) or, perhaps, directly joined to (e.g., integrated into) an upper aft or trailing edge portion of the cabin roof enclosing the tractor cabin 30. Such an elevated positioning of the rear perception module 46 enables the stereoscopic camera assemblies 66-1, 66-2, 66-3 to better "see" over and around any implements, such as balers, seeders, commodity carts, grain carts or wagons, tillage implements, mower-conditioners, and so on, connected to the rear hitch 34 and towed by the tractor 20 at a given juncture in time. Additional benefits are also realized by integration or joinder of the rear perception module 46 into the rear roofline of the tractor cabin 30, as further discussed below in connection the subsequent drawing figures.

Any number of additional subsystems or devices 48 may be deployed onboard the tractor 20, included in the work vehicle perception system 22, and utilized in conjunction with the front perception module 44 and the rear perception module 46. This may include various central processing components 78; e.g., any practical number of processors, control computers, computer-readable memories, power supplies, storage devices, interface cards, and other standardized components, which receive data from the EDP sensor systems within the perception modules 44, 46 and perform any number of processing tasks. The central processing components 78 may also include or cooperate with any number of firmware and software programs or computer-readable instructions designed to carry-out the various process tasks, calculations, and control/display functions described herein. In many instances, the additional subsystems or devices 48 may include a telematics module 80 or wireless datalink (e.g., a modular telematics gateway) allowing remote piloting of the tractor 20 and/or data exchange with a backend service, such as a cloud-based server end, over a communications network to perform certain processing tasks and functions associated with autonomous operation of the tractor 20.

Various other components 82 can also be included in the tractor perception system 22 or otherwise deployed onboard the example tractor 20, such as operator controls and visual interfaces (e.g., display devices), enabling human operators to view information and provide command inputs when present within the cabin 30 of the tractor 20. For example, in instances in which the tractor 20 is piloted by a human operator within the tractor cabin 30, the central processing subsystem 78 may receive obstacle detection data from the sensors within the perception modules 44, 46 and generate various audible, visual, and/or haptic alerts advising the tractor operator of nearby obstacles posing collision risks or otherwise desirably brought to the attention of the operator. Various other guidance functionalities can also be carried-out by the central processing subsystem 78 utilizing data provided by the perception modules 44, 46, such as crop row following functions and lane keeping functions (during public road transport). Generally, then, the tractor perception system 22 can include any number of components, devices, and subsystems suitable for receiving data inputs from the perception modules 44, 46; processing such data inputs; and performing various actions based, at least in part, on consumption of such data inputs, such as automation functions, display/alerting functionalities, and reporting data over the telematics module 80 with a network-connected server end, to list but a few examples.

Figure 2:
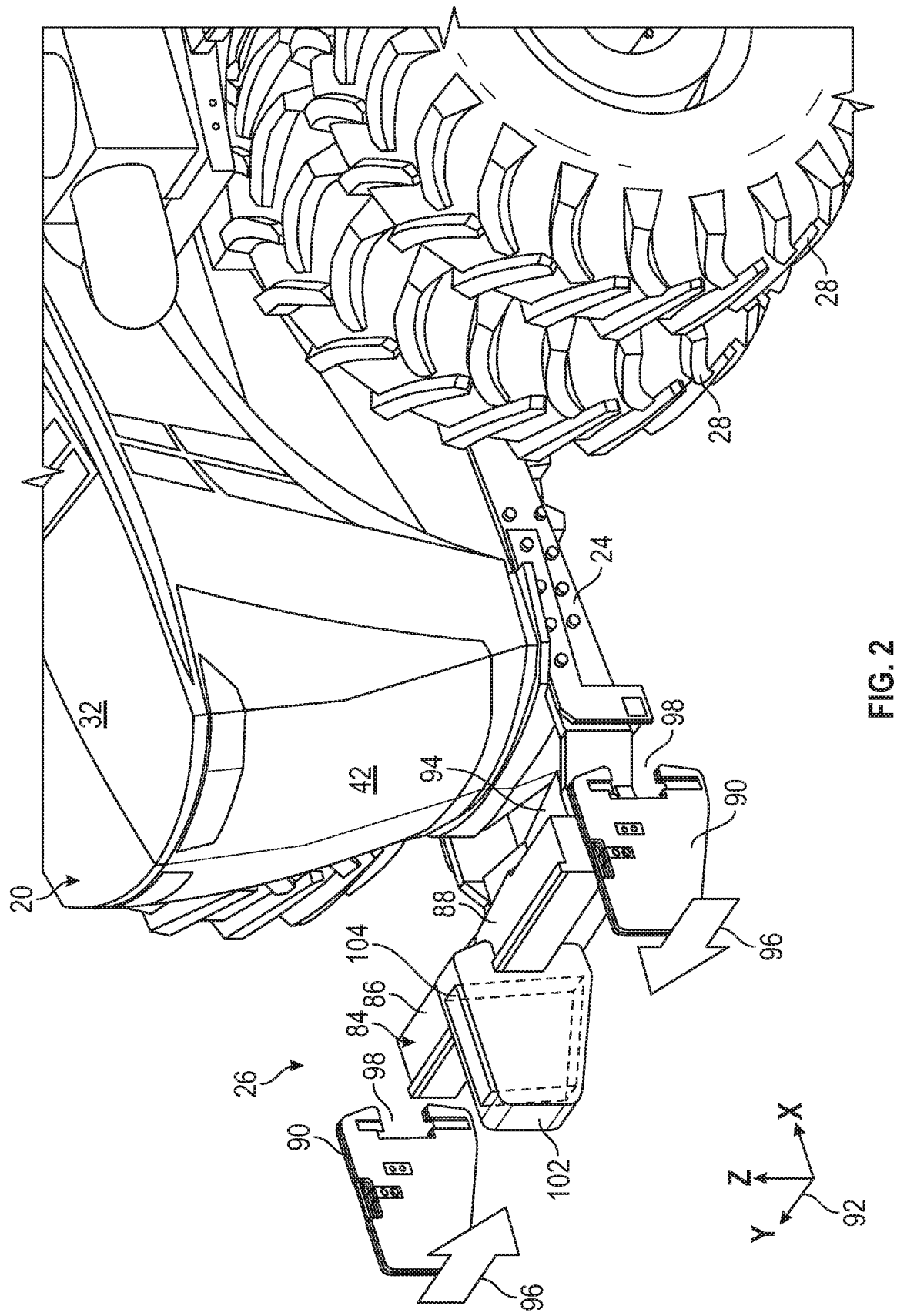
FIG. 2 is an isometric view of a front end portion of the tractor shown in FIG. 1 further illustrating a front ballast system having a laterally-extending hanger bracket, which is shaped and sized to support a number of removable ballast weights and to which the front perception module (hidden from view) is rigidly joined.

Turning to FIG. 2, a forward end of the tractor 20 and the front ballast system 26 are shown in greater detail. In this view, the front perception module 44 is largely or wholly hidden from view to more clearly reveal the front ballast system 26, which can assume any form suitable for supporting a number of removable ballast weights during tractor operation. In the illustrated example, the front ballast system 26 includes a laterally-extending hanger rack or bracket 84 having opposing outer ends serving as weight support sections 86, 88. The laterally-extending hanger bracket 84 is joined to the tractor chassis 24 by a connecting yoke 94, which is, in turn, rigidly joined to the tractor chassis 24. The laterally-extending hanger bracket 84 possesses a beam-like shape or geometry along its length and includes certain physical retention features, such laterally-extending ridges or keys, for retaining removable ballast weights 90 on the weight support sections 86, 88 in multiple degrees of freedom (DOFs). As indicated in FIG. 2 by arrows 96, an operator may manually insert or load a desired number of the removable ballast weights 90 onto the weight support sections 86, 88 of the hanger bracket 84 along insertion axes (parallel to the Y-axis of coordinate legend 92) to bring the front ballast system 26 to a desired cumulative weight. The removable ballast weights 90 can assume various forms suitable for engagement with and retention on the laterally-extending hanger bracket 84. In the illustrated example, the removable ballast weights 90 each have a generally rounded rectangular formfactor, as viewed from the side, and an upper handle easily grasped by an operator. When having such a formfactor, the removable ballast weights 90 are commonly referred to as "suitcase weights." Additionally, the ballast weights 90 include slotted endwall portions 98, which feature slots or keyways in which the laterally-extending ridges or keys of the weight support sections 86, 88 are received when the removable ballast weights 90 are loaded onto the weight support sections 86, 88.

The physical interaction or interference between the ridge or key of the laterally-extending hanger bracket 84 and the keyways of the slotted endwall portions 98 prevents inadvertent disengagement of the removable ballast weights 90 in vertical and longitudinal directions (along the X- and Z-axes of the coordinate legend 92) during tractor operation. Once loaded onto the laterally-extending hanger bracket 84, the removable ballast weights 90 may be retained in their desired positions by friction; or, instead, the ballast weights 90 may be secured to the laterally-extending hanger rack or bracket 84 utilizing quick pins, collars, one or more elongated bolts extending laterally through openings in the ballast weights 90, or similar devices preventing the removable ballast weights 90 from inadvertently disengaging from the laterally-extending hanger bracket 84 along the Y-axis of the coordinate legend 92 until operator removal. Finally, as shown in FIG. 2, and discussed further below, a central structure (herein, a "central support piece 102") may further be provided in embodiments and joined to an intermediate portion of the laterally-extending hanger bracket 84; e.g., the central support piece 102 may be integrally formed with the hanger bracket 84 as a single cast piece, separately fabricated and permanently joined (e.g., welded) to the hanger bracket 84, or separately fabricated and joined to the hanger bracket 84 utilizing bolts or other fasteners. When present, the central support piece 102 contributes additional mass to the front ballast system 26, serves as a centrally-fixed partition to ensure that the ballast weights 90 are distributed across the laterally-extending hanger bracket 84 in a balanced manner, and may help support or attach the front module housing 50 of the front perception module 44, as further described below in connection with FIGS. 3 and 4.

Figure 3:
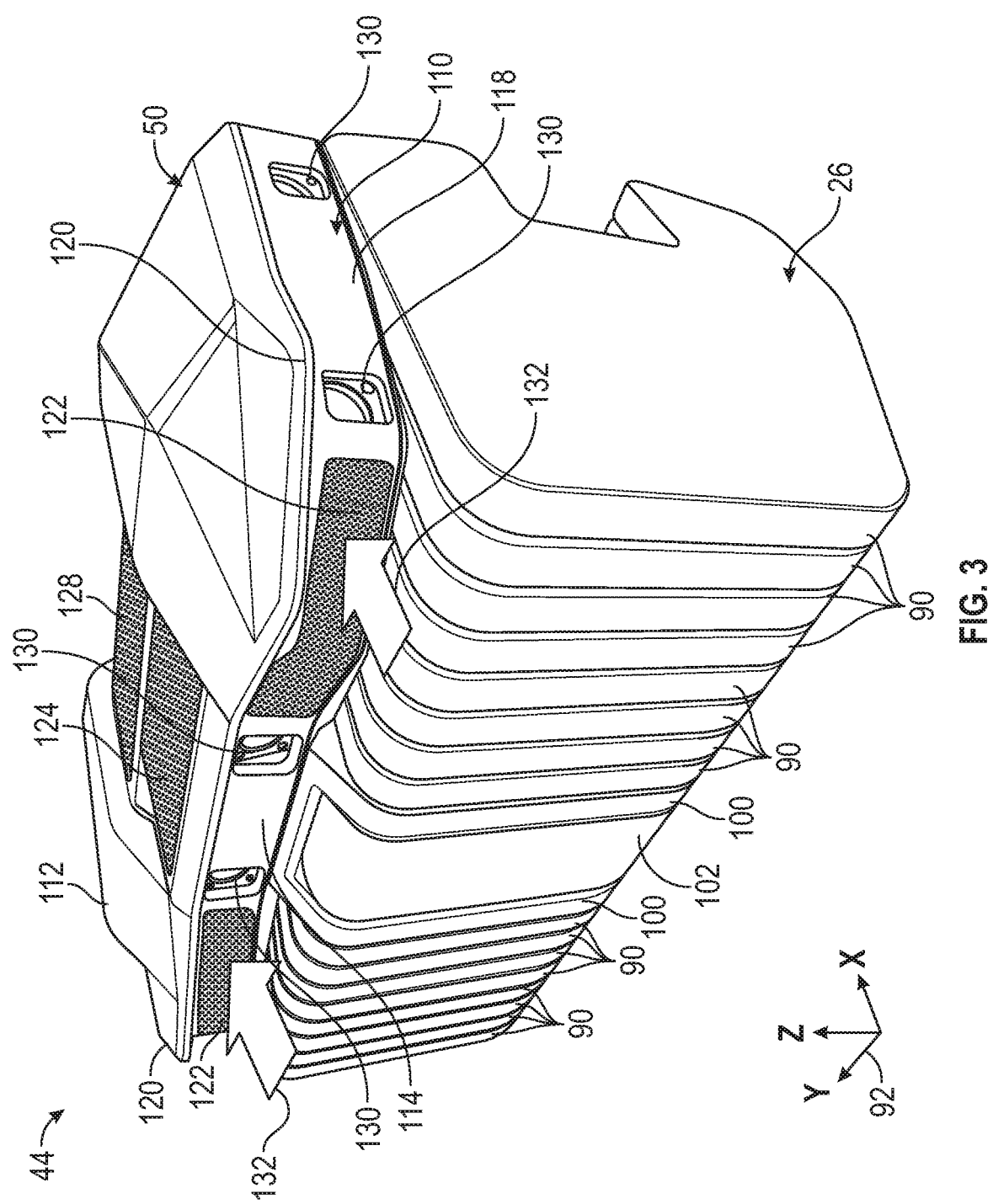
FIGS. 3 and 4 are side perspective and front views, respectively, of the example front perception module including a front module housing containing a number of environmental depth perception (EDP) devices, as well as a number of removable ballast weights loaded onto the hanger bracket of the front ballast system (hidden from view) and positioned beneath the front module housing.
Figure 4:
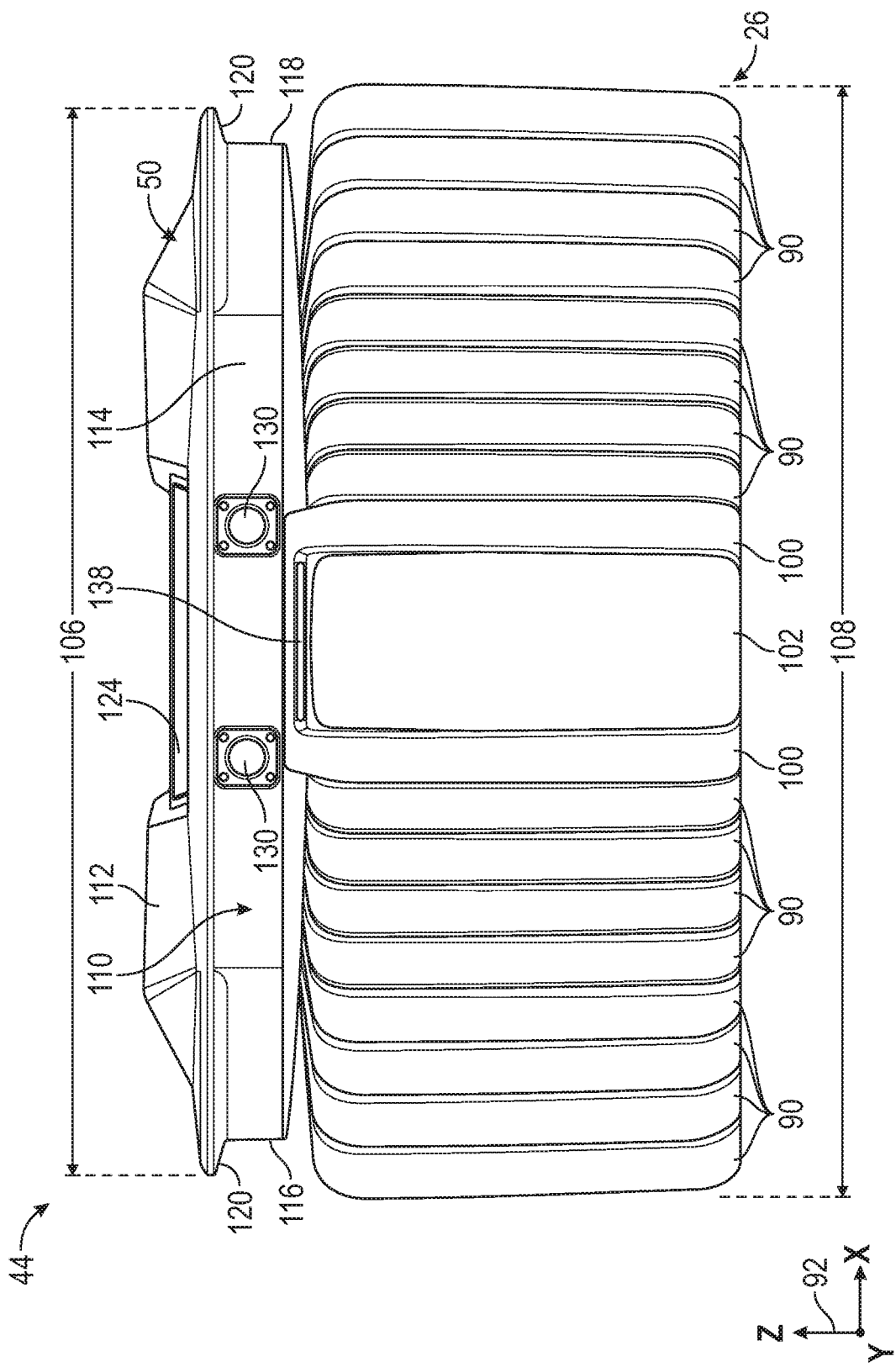

Referring now to FIGS. 3 and 4, the example front perception module 44 is shown in greater detail in addition to the central support piece 102 (which may or may not be included in the front perception module 44) and a plurality of removable ballast weights 90. The front ballast system 26 is considered "fully loaded" in these drawing figures as a maximum number of the removable ballast weights 90 is loaded onto the laterally-extending hanger bracket 84 (not shown for clarity). Specifically, in the illustrated example, eight removable ballast weights 90 are loaded onto each weight support section 86, 88 such that the laterally-extending hanger bracket 84 retains a total of sixteen ballast weights 90. In further embodiments, the laterally-extending hanger bracket 84 may be capable of retaining a greater or lesser number of the removable ballast weights 90 when fully loaded. As a common example, however, front ballast systems including laterally-extending hanger racks or bracket similar to the laterally-extending hanger bracket 84 are often capable of supporting between four and thirty removable ballast weights. The individual mass or weight of each of the removable ballast weights may also vary between embodiments and, in certain cases, the ballast weights may be provided in multiple discrete weight selections. This stated, the removable ballast weights 90 will often each have a standardized weight ranging between about 60 and 120 pounds and, perhaps, equal to about 95 pounds in embodiments.

The front module housing 50 is rigidly joined to the laterally-extending hanger bracket 84, whether by mechanical attachment, by integral formation with any portion of the front module housing 50 with the laterally-extending hanger bracket 84, by welding or another permanent joinder means, or in another manner. In the illustrated example, the front module housing 50 is joined to the laterally-extending hanger bracket 84 utilizing one or more mounting flanges 100, which extend from a lower portion of the front module housing 50 to attach a mid-section of the laterally-extending hanger bracket 84 at a location between the opposing weight support sections 86, 88 of the hanger bracket 84. As indicated above, the central support piece 102 is received or otherwise located between the mounting flanges 100 in the illustrated example such that mounting flanges 100 flank each side of the central support piece 102. The central support piece 102 may serve as a central weight for the front ballast system 26, as well as a physical support or platform for the front module housing 50. Additionally, as shown in phantom FIG. 2, a vertically-extending channel, duct, or conduit 104 (herein, a "thermal chimney 104") can be formed through the central support piece 102 in embodiments. When provided, the thermal chimney 104 enables airflow to travel or rise upwardly through the central support piece 102 and into the underside of the front module housing 50, which may include a corresponding lower vent feature or port. This promotes convective cooling of the heat-generating electronic components 54 (e.g., VPU) contained within the front module housing 50 by allowing such vertical or "convective column" airflow, as further described below.

With continued reference to FIGS. 3-4, the central support piece 102 may be integrally formed with the mounting flanges 100 as a single part or unitary structure in embodiments. Alternatively, when present, the central support piece 102 may be separately formed from the mounting flanges 100 and joined to (e.g., bolted to, welded to, integrally formed with, or otherwise joined to) the laterally-extending hanger bracket 84 in certain implementations. In such implementations, the mounting flanges 100 may be positioned onto either side of the central support piece 102, pivoted into engagement with the laterally-extending hanger bracket 84, and then secured in place utilizing fasteners, welding, or another joinder technique. Various other constructions are also possible in alternative embodiments, providing that the front module housing 50 is rigidly joined to the tractor chassis 24 through the laterally-extending hanger bracket 84 in some manner. For example, in alternative realizations, the lower structure or "mounting base" of the front perception module 44 may insert into one or more corresponding openings provided in the central support piece 102 to secure and register the module 44 to the front ballast system 26.

The mounting flanges 100, and any other associated mount features utilized to secure the front module housing 50 to the laterally-extending hanger bracket 84 (e.g., the central support piece 102), is generally referred to herein as a "mounting base 100, 102." The mounting base 100, 102 may be configured to engage into the laterally-extending hanger bracket 84 to allow attachment of the front perception module 44 via, for example, a retrofit installation. In this case, the mounting base 100, 102 may include one or more mounting flanges (e.g., the mounting flanges 100) having generally C-shaped geometries, which define orifices or slots (shown most clearly in FIG. 6) opening toward the laterally-extending hanger bracket 84. The flange slots may be sized and shaped to enable mating installation of the mounting base 100, 102 on the laterally-extending hanger bracket 84; e.g., by fitting the mounting flanges 100 into engagement with the hanger bracket 84 and then securing the mounting flanges 100 in their desired position. In the illustrated example, specifically, the mounting base of the front perception module 44 includes two C-shaped mounting flanges 100, which are configured to matingly engage into the laterally-extending hanger bracket 84 and which are spaced along an axis extending substantially parallel to the axis along which the front module housing 50 is elongated (corresponding to the Y-axis of coordinate legend 92). In embodiments in which the central support piece 102 is separately fabricated from the mounting flanges 100, the C-shaped mounting flanges 100 may be spaced by a lateral offset equal to or slightly greater the lateral width of the central support piece 102 such that the central support piece 102 is received between the mounting flanges 100 in a close-fit relationship to center the front perception module 44 onto the laterally-extending hanger bracket 84 and to prevent lateral movement of the front perception module 44 once installed onto the front ballast system 26.

In the above-described manner, the front module housing 50 is rigidly coupled to the laterally-extending hanger bracket and, therefore, to the tractor chassis 24 through its mounting base, which includes the above-described mounting flanges 100 and may also include the central support piece 102 in at least some implementations. A structurally-robust attachment interface or mounting is thus provided to minimize the transmission of disturbance forces to the EDP sensor system 52, 54, 56 in the illustrated example embodiment. This, in turn, may reduce sensor errors experienced by the EDP devices 52 (e.g., the stereoscopic camera assemblies 52-1, 52-2, 52-3) as the tractor 20 travels over rough terrain or is otherwise subject to disturbance forces. Reduction of the magnitude (amplitude) of vibrational forces transmitted to the EDP device 52 when assuming the form of the stereoscopic camera assemblies 52-1, 52-2, 52-3, in particular, may ease processing demands by minimizing jitter transmitted to the cameras and the resulting frame-by-frame displacement of the captured imagery.

The front module housing 50 may have various different shapes and constructions in embodiments. In the illustrated example, specifically, the front module housing 50 includes a main housing body 110 having an interior compartment in which the EDP sensor system 52, 54, 56 is housed and which is enclosed by a cover piece 112. The main housing body 110 includes, in turn, a leading or forward-facing wall 114, a first sidewall 116, and a second sidewall 118 opposite the first sidewall 116. A protruding peripheral edge or rim 120 (identified in FIGS. 4 and 5) is further provided at the interface of the main housing body 110 and cover piece 112. When present, the peripheral rim 120 of the main housing body 110 may provide a physical standoff in which componentry is not housed to offer additional impact protection and some degree of light shielding protecting the EDP sensor system 52 contained within the front module housing 50. The front module housing 50 extends over (is cantilevered over or overhangs) opposing side portions of the laterally-extending hanger bracket 84 (the weight support sections 84, 86) in a manner enabling positioning of the removable ballast weights 90 beneath the front module housing 50.

The front module housing 50 has a low profile, pancake-like formfactor, which extends laterally from the mounting flanges 100 in both directions along the Y-axis of coordinate legend 92. Accordingly, the front module housing 50 is elongated in a lateral width direction corresponding to the Y-axis of coordinate legend 92. Concurrently, in the present example, the lateral width of the front module housing 50, as measured along the Y-axis of coordinate legend 92 (represented by double-headed arrow 106 in FIG. 4), is less than the corresponding Y-axis dimension (the lateral width) of the laterally-extending hanger bracket 84, as measured from the outer terminal end of the weight support section 86 to the outer terminal end of the opposing weight support section 88 (represented by double-headed arrow 108). Further, as best seen in FIG. 3, the leading edge portion or the peripheral rim 120 of the front module housing 50 are recessed relative to the leading edge of the front ballast system 26 (including the removable ballast weights 90) to provide mechanical protection in the unlikely event of collision.

Several airflow ports or vents 122, 124, 126, 128 are formed in different walls or surfaces of the front module housing 50, with each vent 122, 124, 126, 128 potentially covered utilizing a perforated plate or mesh screen in embodiments. Soo too is a number of sensor line of sight (LOS) openings or apertures 130 formed in the front module housing 50 at appropriate locations to provide the desired sensor FOV extending forward and to the sides of the front perception module 44 and, more generally, the host tractor 20. In the illustrated embodiment, the sensor LOS apertures 130 are formed in the peripheral walls 114, 116, 118 of the front module housing 50 such that: (i) a first EDP sensor (the stereoscopic camera assembly 52-1, identified in FIG. 1) has an LOS extending through one or more apertures 130 provided in the leading wall 114 of the front module housing 50; (ii) a second EDP sensor (the second stereoscopic camera assembly 52-2, FIG. 1) has an LOS extending through one or more apertures 130 provided in the first sidewall 116 of the front module housing 50; and (iii) a third EDP sensor (the third stereoscopic camera assembly 52-3, FIG. 1) has an LOS extending through one or more apertures 130 provided in the second, opposing sidewall of the front module housing 50. Generally, then, the EDP sensor system 52, 54, 56 includes a plurality of EDP devices (here, the stereoscopic camera assemblies 52-1, 52-2, 53-3) distributed about a peripheral portion of the front module housing 50 to provide a cumulative forward-centered FOV having a relatively broad or wide angular range in a horizontal plane; e.g., a forward-centered FOV equal to or greater than 180 degrees seen looking downwardly onto the tractor 20, as described above in connection with FIG. 1.

Figure 5:
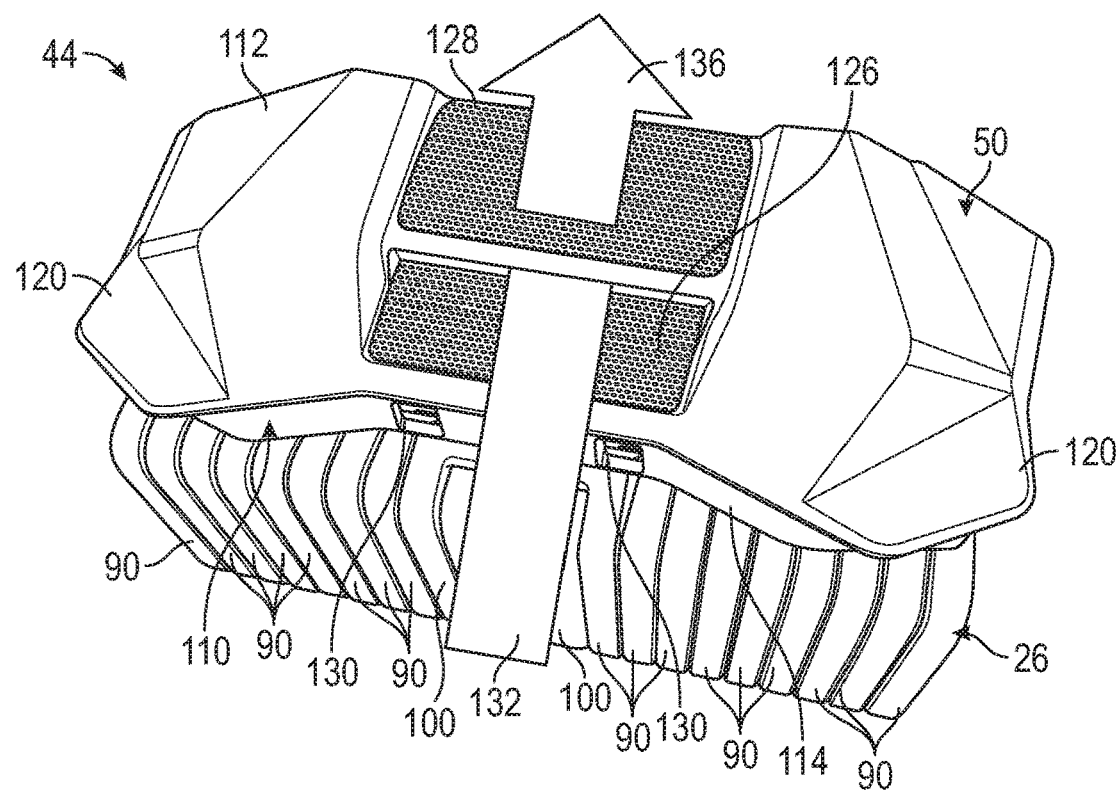
FIGS. 5 and 6 are perspective views of the example front perception module, which jointly illustrate one manner in which airflow may be directed through the front module housing along one or more of cooling airflow paths to dissipate heat generated by at least one heat-generating electronic component, such as a visual processing unit (VPU), contained within the front perception module and electrically coupled to the EDP devices.
Figure 6:
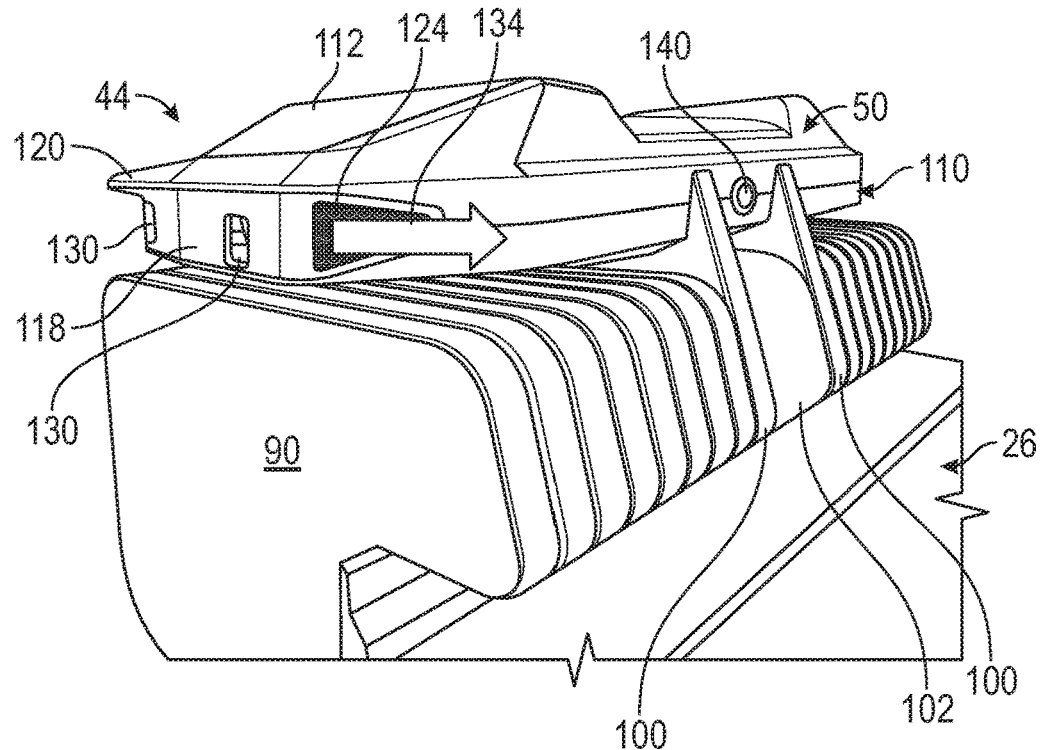
Figure 7:
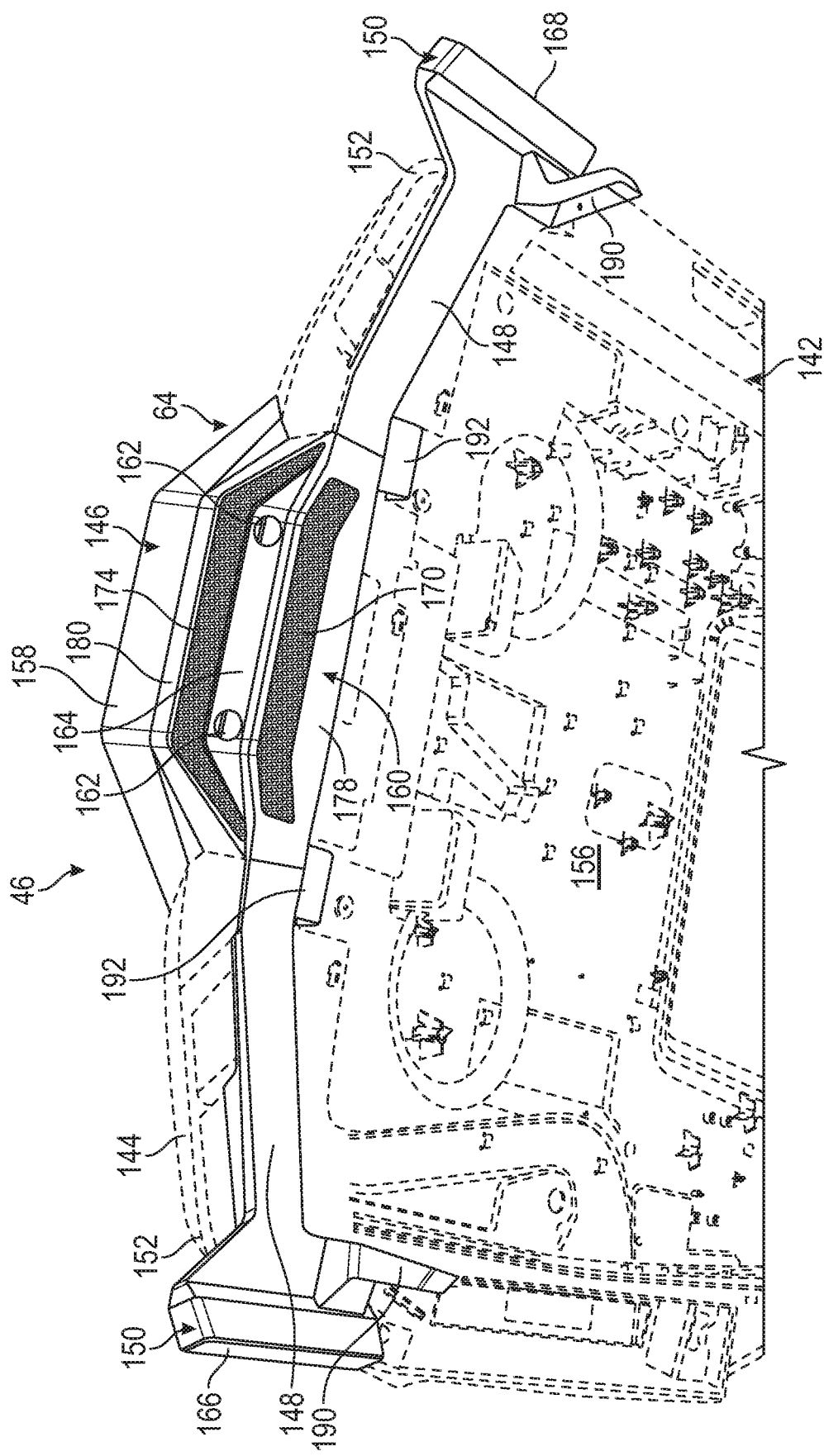
FIGS. 7, 8, and 9 are lower perspective, upper perspective, and side views, respectively, of the rear perception module mounted adjacent or to a trailing edge portion of the cabin roof of the tractor shown in FIG. 1, as illustrated in accordance with an example embodiment of the present disclosure.
Figure 8:
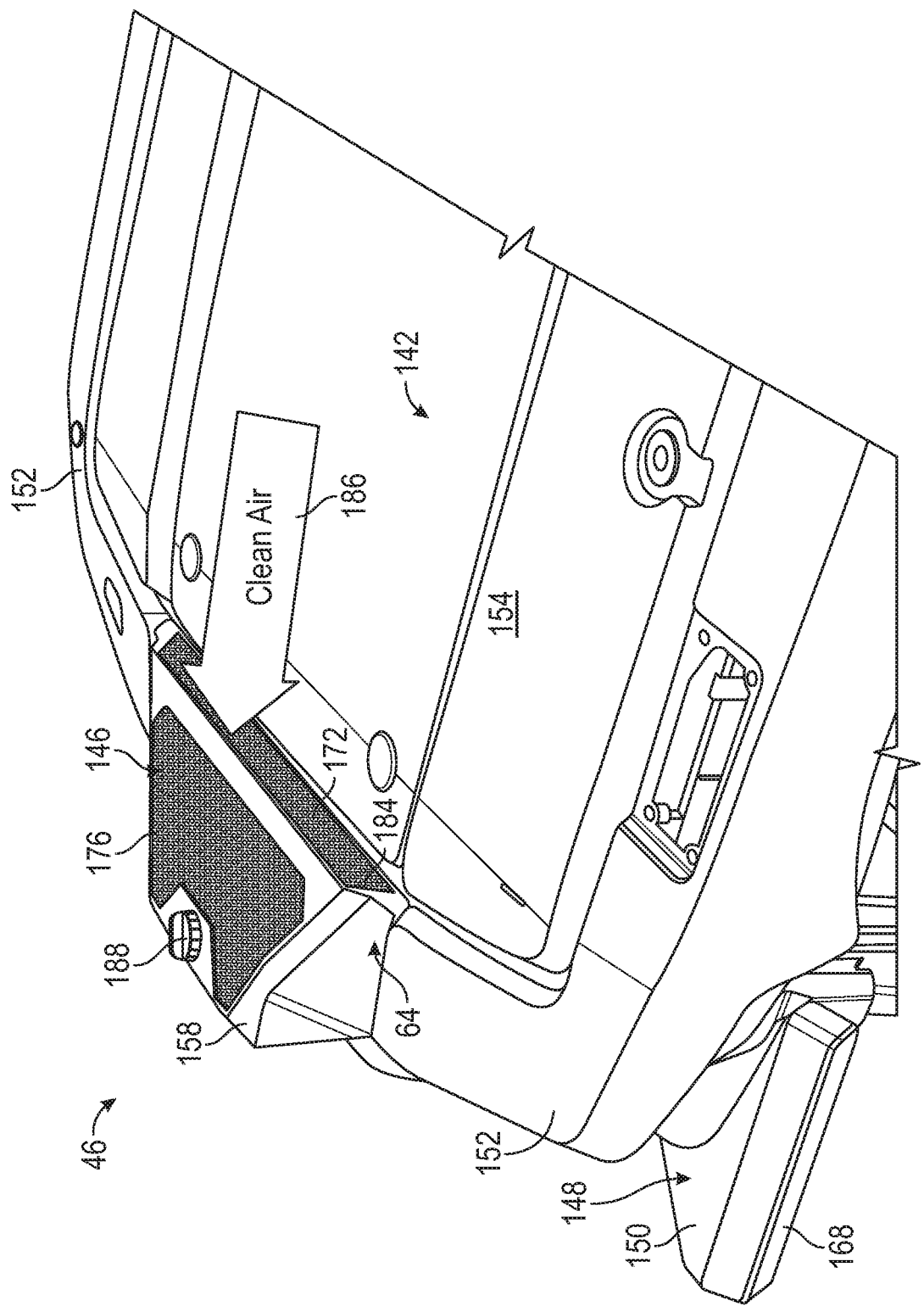
Figure 9:
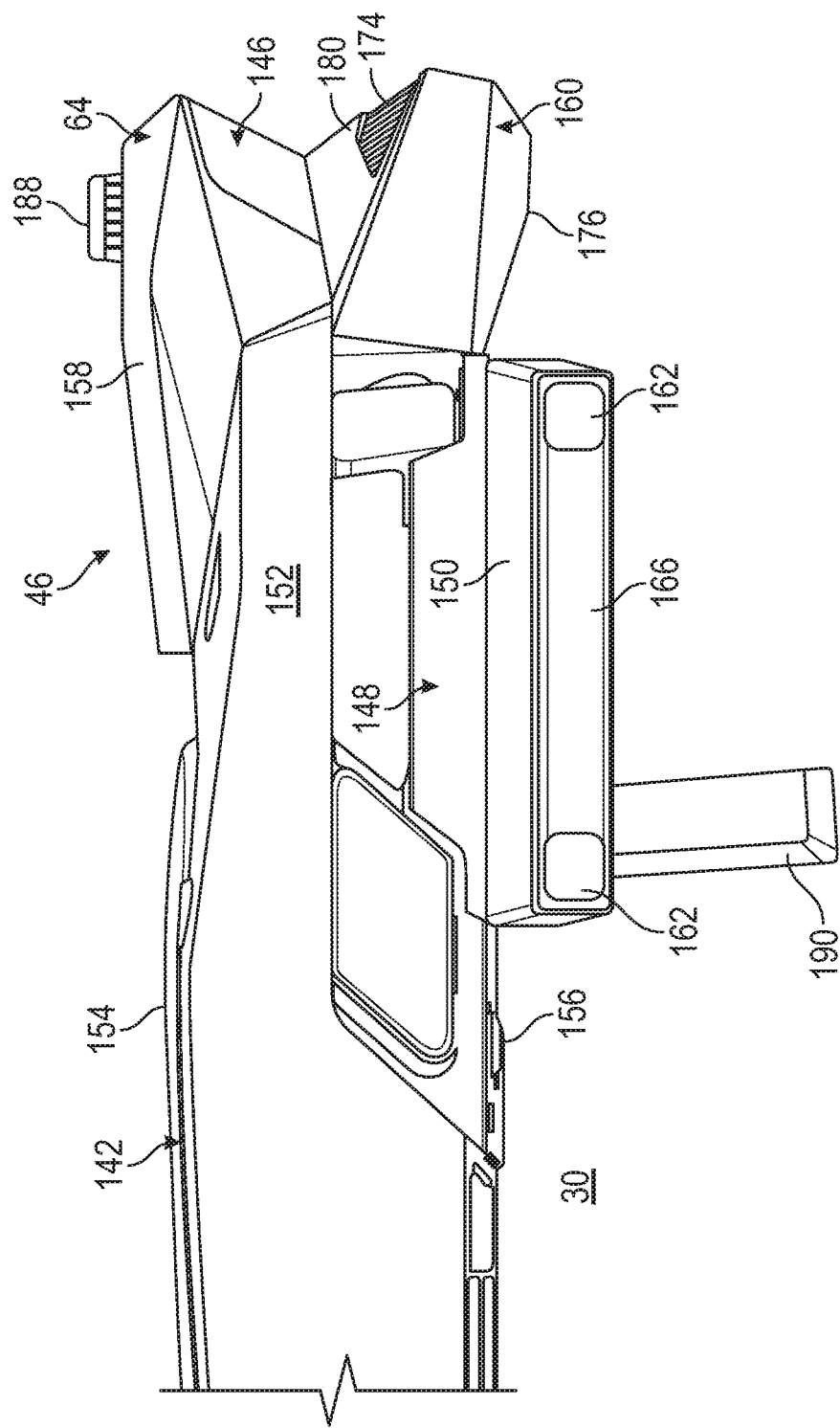

As previously stated, airflow vents 122, 124, 126, 128 are formed at locations through exterior walls or surfaces of the front module housing 50. Generally, the airflow vents 122, 126 serve as inlet vents, while the airflow vents 124, 128 serve as outlet vents of the front module housing 50. The inlet vents 122, 124 of the front module housing 50 are positioned to receive ram airflow into the interior of the front module housing 50 as the tractor 20 travels in a forward direction. Such airflow travels along cooling airflow paths extending through the front module housing 50 from the inlet vents 122, 124 to the outlet vents 126, 128, broadly considered. The cooling airflow paths extending from the inlet vents 122 to the outlet vents 124 are represented in FIGS. 3 and 6 by arrows 132, 134; while the cooling airflow path extending from the inlet vent 124 to the outlet vent 128 is represented in FIG. 5 by an arrow 136. In certain embodiments, at least one opening serving an additional "underside" inlet vent may be formed in a lower or bottom wall of the front module housing 50, as generically indicated in FIG. 4 by graphic 138. When provided, such an underside inlet vent (graphic 138) may be positioned to intake rising airflow into an interior compartment of the front module housing 50, with the thermal chimney 104 fluidly coupled to the inlet vent formed in the bottom wall of the front module housing 50. Airflow may therefore be conducted through the thermal chimney 104 and into the front module housing 50 via the bottomside inlet vent 138 as such airflow rises, absorbs excess heat from the heat-generating electronic component(s), and pulls additional airflow in a generally upwardly through the thermal chimney 104 and into the interior of the front module housing 50.

In at least some embodiments of the front perception module 44, one or more of the heat-generating electronic components 54 may be positioned in or adjacent the cooling airflow paths 132, 134, 136 such that excess heat generated by the heat-generating electronic component(s) 54 is dissipated by convective transfer to airflow conducted along the cooling airflow path during operation of the front perception module 44. As noted above, the heat-generating electronic component 54 may be visual processing circuitry, such as a VPU, electrically coupled to the EDP devices 52 when assuming the form of stereoscopic camera assemblies; with the VPU (or other heat-generating electronic component 54) generally mounted in a central portion of the front module housing 50 to maximize exposure to the cooling airflow directed along the cooling airflow paths 132, 134, 136. Accordingly, in embodiments, the heat-generating electronic component(s) 54 (e.g., a VPU or other visual processing circuitry) may be positioned rearward of the central stereoscopic camera assembly 52-1; between the left and right stereoscopic camera assemblies 52-2, 52-3; and above the thermal chimney 104 and the underside inlet vent 138 when provided. In other implementations, the heat-generating electronic component(s) 54 of the EDP sensor system 52, 54, 56 may be located within a different region of the front module housing 50; or may be omitted from the EDP sensor system 52, 54, 56 altogether.

Due to the positioning of the above-described airflow vents 122, 124, 126, 128, 138, cooling airflow may be directed through the front module housing 50 when the tractor 20 travels in a forward direction and when the tractor 20 remains substantially stationary. Moreover, airflow through the front perception module 44 may be further promoted by positioning one or more outlets vents (here, the outlet vents 124, 128) adjacent the grille 42 of the tractor 20 such that airflow is drawn into the front module housing 50 when the radiator fan 40 is active. In this manner, the front perception module 44 leverages proximity to the radiator fan 40 to further boost convective of the heat-generating electronic component(s) 54 within the front perception module 44. The thermal dissipation or heat rejection capabilities of the front perception module 44 are enhanced as a result, including in embodiments in which the front perception module 44 itself lacks any fans or other active cooling mechanisms. This, in turn, may help ensure optimal performance of the EDP sensor system 52, 54, 56, while minimizing the part count, reducing the complexity, and improving the overall reliability of the front perception module 44. This benefit notwithstanding, the front perception module 44 can contain fans or other active cooling devices in alternative implementations.

In the above-described manner, the front perception module 44 provides improved heat dissipation of components contained within the EDP sensor system 52, 54, 56 to prolong service life and promote optimal operation of vital electronic components, such as any visual processing components contained within the EDP sensor system 52, 54, 56. Additionally, mechanical protection is afforded to the EDP sensor system 52, 54, 56 by virtue of secure mounting to the hangar bracket 84 included in the front ballast system 26 and the recessing the leading (and possibly side) edges of the front module housing 50 relative to the leading (and side) edges of the front ballast system 26. During operation of the front perception module 44, the EDP sensor system 52, 54, 56 may communicate with the central processing subsystem 78 or other onboard subsystem 48 over any suitable wired or wireless connection. As shown in FIG. 6, a connector port 140 may be provided in the rear of the front module housing 50 for routing wire harness or connector cables provided the desired electrical connections within the electronic components contained in the front perception module 44. In other embodiments, a different wire routing scheme may be employed; and, in implementations in which the front perception module 44 or the front ballast system 26 include a thermal chimney 104 or similar vertically-extending channel, the wire bundles or cables may be routed through or adjacent the thermal chimney 104 and to a suitable interface point within the electronics onboard the tractor 20.

Turning next to FIGS. 7-10, an example embodiment rear perception module 46 is shown as installed along the rear of a cabin roof 142 enclosing the tractor cabin 30. As can be seen, the rear module housing 64 of the rear perception module 46 is joined to a trailing or rear edge portion 144 of the cabin roof 142; and, in embodiments, may define one or more surfaces of the rear portion 144 of the cabin roof 142. In the illustrated example, the rear module housing 64 includes a central housing body 146 and two wing sections 148. The wing sections 148 of the rear module housing 64 extend from the main housing body 146 in opposing directions and each terminate in an enlarged lateral end portion 216. Specifically, the wing sections 148 terminate adjacent opposing rear corner regions 152 of the cabin roof 142, with each enlarged lateral end portion 216 located below an upper surface or topside 210 of the cabin roof 142 and tilted in a slight downward direction. Further, as shown most clearly in FIG. 7, the wing sections 148 extend along an underside 156 of the cabin roof 142; and, perhaps, may fit into and extend within channels or larger open slots formed in the underside 156 of the cabin roof 142. Comparatively, the central housing body 146 includes an upper raised portion 158 that projects upwardly from the upper surface or topside 210 of the cabin roof 142. Additionally, the central housing body 146 of the rear module housing 64 includes a rear protruding section 160, which projects from the cabin roof 142 or, more generally, from the tractor cabin 30 in a rearward direction.

Due to the geometry of the rear perception module 46, and specifically the manner in which the rear module housing 146 spans the width of the cabin roof 142 and may wrap around an upper peripheral edge of the tractor cabin 30 to some extent, optimal position is provided for multiple EDP devices about the upper rear periphery of the tractor roof 142. In embodiments, the rear perception module 46 includes a first EDP device (e.g., the stereoscopic camera assembly 66-1 identified in FIG. 1) having an LOS extending through one or more apertures 162 provided in a rear-facing wall 164 of the central housing body 146; a second EDP device (e.g., the stereoscopic camera assembly 66-2) having an LOS extending through one or more apertures 162 provided in an outer terminal (lateral-facing) wall of a first wing section 148; and a third EDP device (e.g., the stereoscopic camera assembly 66-3) having an LOS extending through one or more apertures 162 provided in an outer terminal wall 168 of the other of the wing sections 148. Collectively, the EDP devices (e.g., the stereoscopic camera assemblies 66-1, 66-2, 66-3) are positioned to provide a cumulative rear-centered FOV equal to or greater than 180 degrees (°), as seen looking downwardly onto the tractor 20. By virtue of such positioning or angular distribution of the stereoscopic camera assemblies 66-1, 66-2, 66-3, the rear perception module 46 combines or cooperates with the front perception module 44 to provide a 360° cumulative FOV for the stereoscopic camera assemblies 66-1, 66-2, 66-3 (or other EDP devices) housed within the perception modules 44, 46, thereby enabling the perception system 22 to provide full coverage monitoring of the surrounding environment of the tractor 20 in essentially all directions.

Figure 10:
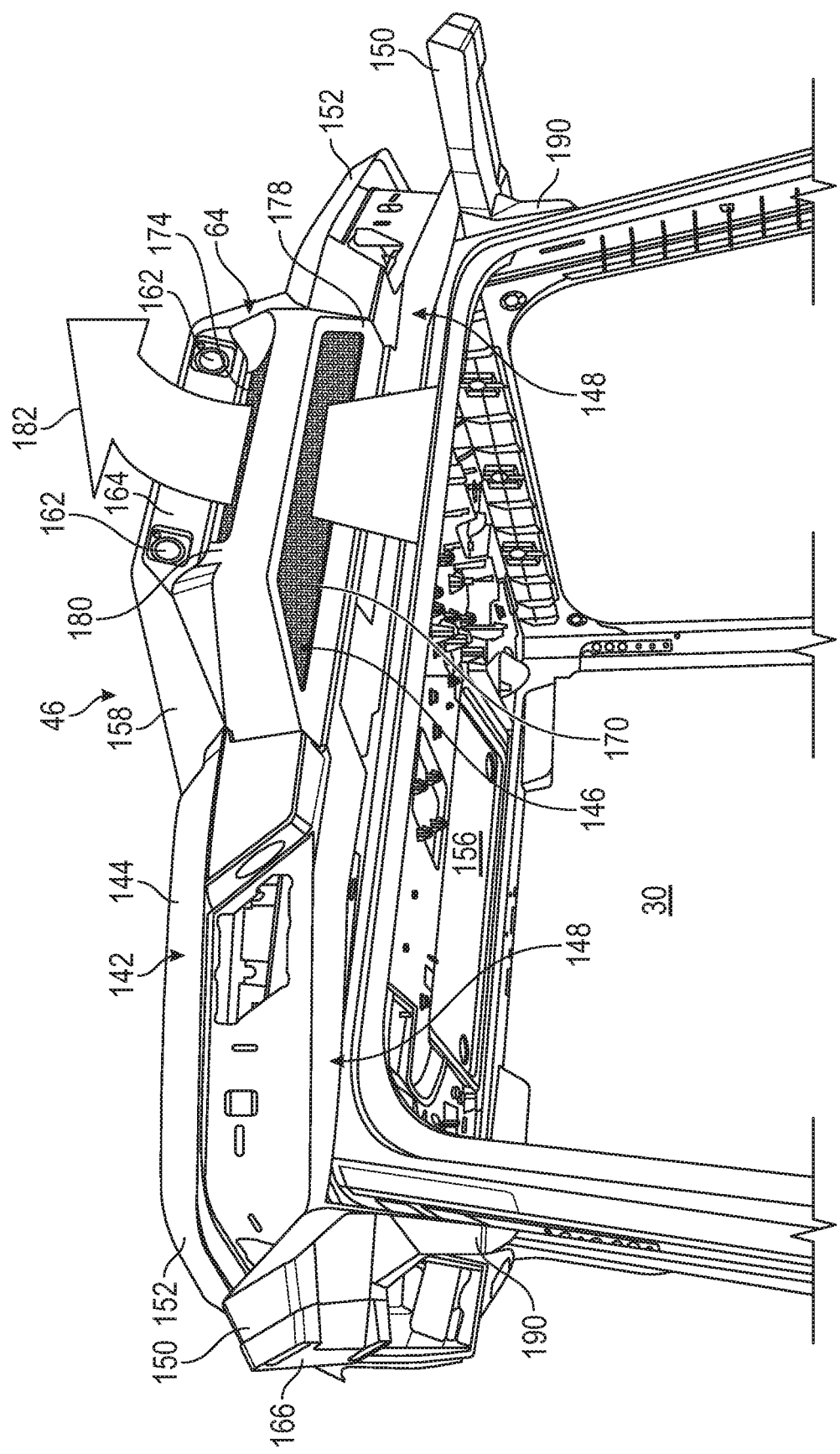
FIG. 10 is a rear perspective view of the cabin roof and the rear perception module illustrating one manner in which airflow may be directed through the rear module housing along one or more cooling airflow paths to dissipate heat generated by at least one heat-generating electronic component (e.g., a VPU) further contained within the rear perception module.

Various grated or screened airflow vents 170, 172, 174, 176 are beneficially formed in exterior walls of the rear module housing 146 at selected locations, which facilitate airflow through the rear module housing 146 along one or more cooling airflow paths. For example, as indicated in FIG. 10, an underside inlet vent 170 may be formed in a lower wall 178 of the rear protruding section 160, while a corresponding outlet vent 174 may be formed in an upper wall 180 of the rear protruding section 160. Further, in this case, the inlet vent 170 may be oriented to receive airflow conducted in a generally upward direction alongside a rear window of the tractor cabin 30, with such rising airflow drawn into the rear protruding section 160 through the underside inlet vent 170 and then discharged through the outlet vent 174 after being conducted through the rear protruding section along a first cooling airflow path (indicated in FIG. 10 by an arrow 182). Additionally or alternatively, rear perception module 46 may be fabricated to include a ram inlet vent 172, which is formed in a raised upper or topside surface 184 of the rear module housing 146. The raised topside surface 184 of the rear module housing 146 projects upwardly from the upper surface or topside 210 of the cabin roof 142 and has an angled surface in which the ram inlet 172 is formed to intake ram airflow as the tractor 20 travels in a forward direction. This airflow may be conducted along a second cooling airflow path before discharge from the rear module housing 146 through an associated outlet vent 176, as indicated FIG. 8 by an arrow 186.

In at least some embodiments of the rear perception module 46, one or more of the heat-generating electronic components 54 may be positioned in or adjacent the cooling airflow paths 182, 186 such that excess heat generated by the heat-generating electronic component(s) 68 is dissipated by convective transfer to airflow conducted along the cooling airflow paths 182, 186 during operation of the rear perception module 46. As noted above, the heat-generating electronic component 68 may be visual processing circuitry, such as a VPU, electrically coupled to the EDP devices 66 when assuming the form of stereoscopic camera assemblies; with the VPU (or other heat-generating electronic component 68) at least partially positioned in the rear protruding section 160 of the rear module housing 64 to maximize exposure to the cooling airflow directed along the cooling airflow paths 182, 186. Thus, in effect, the rear module housing 64 may serve as a flowbody or duct member in which the heat-generating electronic component 68 (e.g., VPU or other visual processing circuitry) is located and through the cooling airflow paths 182, 186 pass to provide efficient dissipation of excess heat generated by the component 68. A highly efficient heat dissipation scheme is thus provided to convectively cool heat-generating electronic components contained within the rear perception module 46 for enhanced thermal performance, even in the absence of fans or other active cooling mechanisms within the module 46. The performance of the housed EDP sensors (e.g., the stereoscopic camera assemblies 66-1, 66-2, 66-3) may be optimized as a result, while the overcall complexity, cost, and part count of the rear perception module 46 is minimized.

Finally, various other features or devices may also be included in the rear perception module 46, such as a wireless receiver 188 and mounting features 190, 192. In the illustrated example, such mounting features 190, 192 include door hinge point attachments 190 and window glass hinge point clips 192 (FIG. 7) sized, shaped, and positioned to interface with the infrastructure of the tractor cabin 30. By virtue of integration into the trailing edge portion of the cabin roof 142 in this manner, the rear perception module 46 provides relatively little, if any obstruction of operator sightlines through the rear cabin windows. Concurrently, the rear perception module 46 provides adequate EDP device elevation to provide sensor sightlines over and around various implements or machines that may be towed by the tractor 20 at different junctures in time. Finally, as noted above, the manner in which the rear perception module 46 spans the width of the tractor cabin roof 142, with sensor housing compartments provided in the rear protruding section 160 and the enlarged terminal end sections 166, 168 enables optimal positioning of the EDP devices (e.g., the stereoscopic camera assemblies 66-1, 66-2, 66-3) to achieve a relatively wide angle cumulative FOV of the rear EDP sensor system 66, 68, 70 approaching or exceeding 180° in embodiments. When combined with a front perception module likewise providing such a broad FOV approaching or exceeding 180°, such as the front perception module 44 described above in connection with FIGS. 1-6, the cumulative FOV of EDP devices 52 included in the work vehicle perception system 22 can provide complete, 360° coverage to of the environment surrounding the tractor 20.

Figure 11:
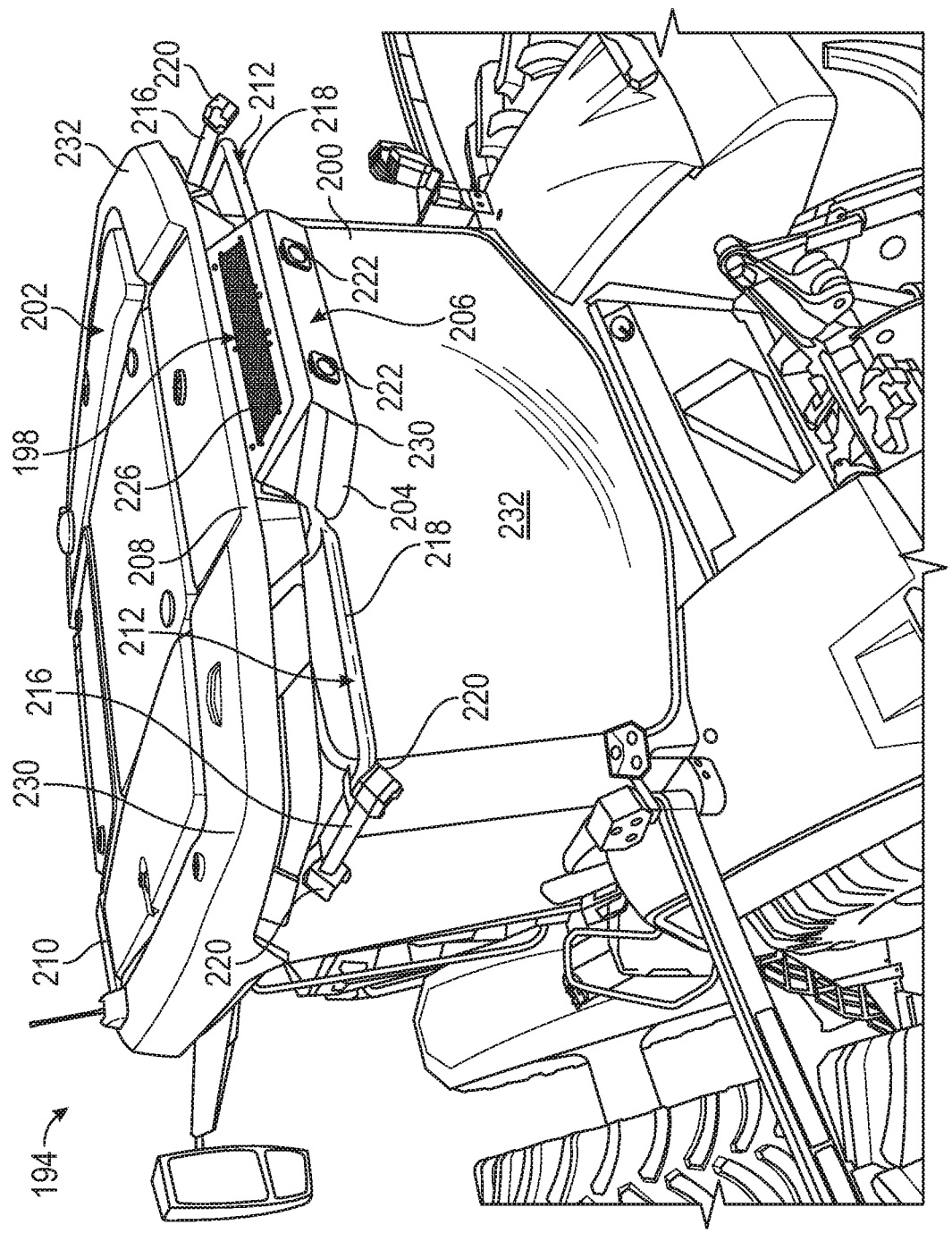
FIGS. 11 and 12 illustrate of a work vehicle (again, a tractor) equipped with a work vehicle perception system including rear perception module, as seen from different vantages points and presented in accordance with a further example embodiment of the present disclosure.
Figure 12:
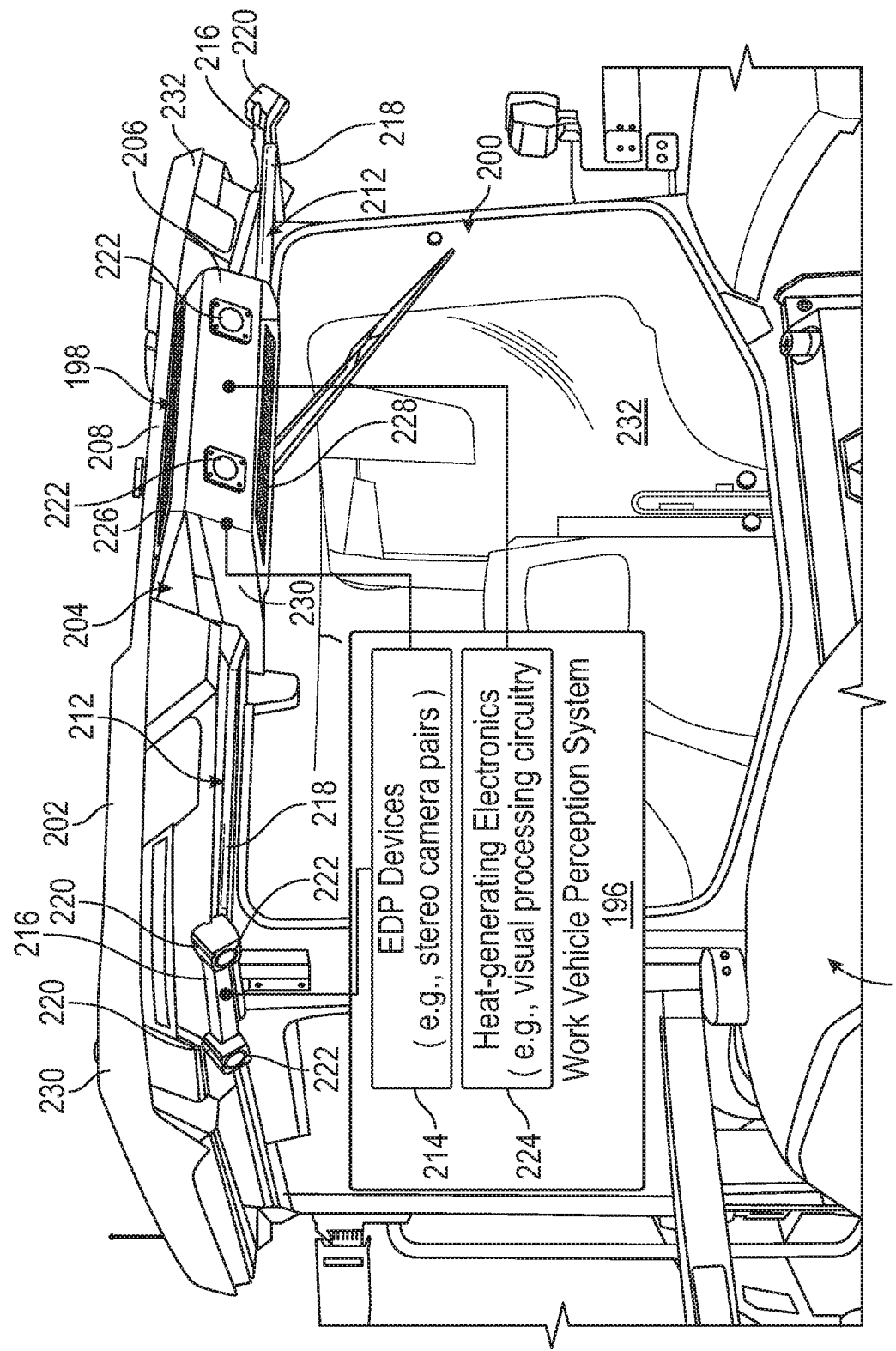

Additional Example Embodiment of the Rear Perception Module and Associated Structure Turning to FIGS. 11 and 12, a work vehicle in the form of a tractor 194 is equipped with a work vehicle perception system 196, as presented in accordance with a further example embodiment of the present disclosure. As was previously the case, the work vehicle perception system 196 (hereafter the "tractor perception system 196") includes a rear perception structural assembly or "module" 198 mounted to an upper trailing edge portion of a cabin 200 of the tractor 194 at an elevated location. In addition to the rear perception module 198 and the electronic componentry therein, the tractor perception system 196 may also potentially include other components onboard the tractor 194 and a non-illustrated front perception module, which may be similar to or, perhaps, substantially identical to the front perception module 44 shown in FIGS. 1-6. In other embodiments, the tractor perception system 196 may include additional perception modules mounted to other portions of the tractor 194, such as the lateral side regions of the cabin roof; or, instead, the tractor perception system 196 may lack any additional perception modules beyond the rear perception module 198.

The electronic components contained within the rear perception module 198 may also be similar, if not substantially identical to those described above in connection with the rear perception module 46. Accordingly, the electronic components within the front perception module may include a number of EDP devices 214 and, perhaps, other heat-generating electronics 224 (that is, IC dies or other electronics prone to excess heat generation during operation) electronically coupled to the EDP devices 214. As discussed at length above, such the EDP devices 214 can assume the form of radar, lidar, and sonar-based sensors, which emit energy pulses and measure pulse reflections utilizing transducer arrays to estimate the proximity of various objects and surfaces located within the surrounding environment or vicinity of the tractor 194; however, the EDP devices 214 beneficially assume the form of stereoscopic camera assemblies or "stereo camera pairs" for the reasons previously discussed and will thus be principally described below as such. Further, the heat-generating electronics 224 may include processing units or devices (e.g., populated circuit or wiring boards to which at least one IC die is attached and encompassed by the term "VPU" or "VPU assembly") for processing visual imagery signals provided by the EDP devices 214 when assuming the form of stereo camera pairs. Additional description of one manner in which such EDP devices 214 may be distributed about the rear perception module 198 to cumulatively provide a relatively broad FOV, such as a rearward-centered FOV equal to or greater than 180 degrees as seen looking downwardly onto the tractor 194, is set-forth below in connection with FIGS. 11-13.

In the example embodiment of FIGS. 11 and 12, the rear perception module 198 includes a rear module housing assembly 204 or, more simply, a "rear module housing 204." The rear module housing 204 may be composed of any number of individual housing components or sections; and includes, among other sections or portions, a central housing section or body 206. As was the rear perception module 46 of the tractor perception system 22 described above in connection with FIGS. 7-10, the rear module housing 206 of the rear perception module 198 is joined or mounted to a trailing or rear edge portion 208 of the cabin roof 202. However, in this particular example, the central housing body 206 of the rear perception module 198 is mounted to an aft edge of the cabin roof 202 in a cantilevered manner such that the central housing body 206 projects from the cabin roof 202 and the rear window 232 of the tractor cabin 202 in a rearward direction. Additionally, and in contrast to the rear perception module 46 (FIGS. 7-10), the central housing body 206 of the rear module housing 204 does not project above the upper surface or topside 210 of the cabin roof 202, but is rather located an elevated below the roof topside 210 and angles downwardly relative thereto by some extent, as taken in a rearward direction.

In addition to the central housing body 206, the example rear perception module 198 includes two laterally-elongated wing sections 212, which extend form the central housing body 206 in opposing lateral direction and which may partially wrap around the rear outer periphery of the tractor cabin 200. As was previously the case, the wing sections 212 extend from the central housing body 206 in opposing lateral direction. The wing sections 212 terminate adjacent opposing rear corner regions 152 of the cabin roof 202, with each enlarged lateral end portion 216 located below an upper surface or topside 210 of the cabin roof 202 and tilted in a slight downward direction to impart the EDP devices 214 housed within the end portions 216 with a desired LOS. In this particular example, the wing sections 212 of the rear module housing 206 include laterally-extending arm or framework members 218, which extends from the central housing body 204 alongside an upper edge portion of the tractor rear window 232 in lateral directions to the respective enlarged lateral end portions 216. Stated differently, rear module housing 204 may described as comprised of a central housing unit (body 206) and two side housing units (enlarged end portions 216 of wing sections 212), which are interconnected and mounted to the upper trailing edge portion of the tractor cabin 200 via the framework members 218. The framework members 218 (one of which is more clearly shown in FIG. 13) may be formed from tubing in certain embodiments. In this case, wiring harnesses or cabling may be routed from the EDP devices 214 housed in the end portions 216 to circuitry (e.g., a VPU and possibly other processing components identified as the "heat-generating electronics" 224 in FIG. 12) through the internal channel or conduits of the framework members 218. In other instances, a different wiring scheme may be employed or the EDP devices 214 distributed within the rear module housing 204 may communicate wireless with each other and/or with other circuitry contained within the work vehicle perception system 196 external to the rear module housing 204.

As schematically indicated in FIG. 12, the rear perception module 198 houses a number of EDP devices 214, which are in signal communication with heat-generating electronics 224 (e.g., a VPU assembly). In embodiments, the EDP devices 214 may include a first EDP device (e.g., a first laterally-looking stereoscopic camera assembly or "stereo camera pair") having an LOS extending through one or more apertures 222 provided in an outer terminal (lateral-facing) wall of the first wing section 212; a second EDP device (e.g., a second laterally-looking stereo camera pair) having an LOS extending through one or more apertures 222 provided in an outer terminal (lateral-facing) wall of the second wing section 212; and third EDP device (e.g., rearwardly-looking stereo camera pair) having an LOS extending through one or more apertures 222 provided in a rearward-facing wall of the central housing body 206. Accordingly, the first laterally-looking stereo camera pair may be housed in the lateral end portion 216 depicted on the right in FIGS. 11 and 12, noting the enlarged end nodules 220 accommodating the twin cameras included in the stereo camera pair in the illustrated embodiment. The second laterally-looking stereo camera pair may be housed in the lateral end portion 216 depicted on the left in FIGS. 11 and 12; and the rearwardly-looking stereo camera pair may be housed in the central housing body 206 of the rear module housing 204. Collectively, the stereo camera pairs may provide a cumulative rear-centered FOV equal to or greater than 180 degrees, as seen looking downwardly onto the tractor 20, thereby enabling the work vehicle perception system 196 to provide comprehensive visual coverage monitoring of the surrounding environment of the tractor 194. Such beneficial positioning of the stereo camera pairs (or other EDP devices 214) may be facilitated, in embodiments, due to the manner in which the rear perception module 198 wraps around an upper trailing peripheral edge of the tractor cabin 200 in the present example.

The central housing body 206 of the rear perception module 198 includes or largely consists of a rear protruding section 230. The rear protruding section 230 projects from the cabin roof 202 or, more generally, the tractor cabin 200 in a rearward direction and may be visible looking downwardly on the tractor 194. An outlet vent 226 is formed in an upper or topside wall of the rear protruding section 230, while an inlet vent 228 is formed in a lower, downwardly-facing wall of the rear protruding section 230. By virtue of this positioning, the inlet vent 228 is oriented to receive airflow conducted in a generally upward direction alongside the rear window 232 of the tractor cabin 200. The heat-generating electronics 224 (FIG. 12) of the tractor perception system 196 are beneficially housed in the rear protruding section 230 of the central housing body 206; and thus may be positioned in or adjacent the cooling airflow path extending from the lower or bottomside inlet vent 228 to the upper outlet vent 226. In this manner, excess heat generated by the heat-generating electronic component(s) 224 is dissipated by convective transfer to airflow conducted along the cooling airflow during operation of the rear perception module 198. As previously indicated, the heat-generating electronic component 68 may be visual processing circuitry, such as a VPU assembly, electrically coupled to the EDP devices 214 when assuming the form of stereoscopic camera assemblies; with the VPU assembly (or other heat-generating electronic component 68) at least partially positioned in the rear protruding section 160 of the rear module housing 206 to maximize exposure to the cooling airflow directed passively along the cooling airflow paths extending through the module housing 206. Additional discussion in this regard is provided below in connection with FIG. 13.

In contrast to the rear perception module 46 shown in FIGS. 7-10, the rear perception module 198 is joined to the cabin roof 142 in a somewhat less integrated manner in the example embodiment of FIGS. 11 and 12. As discussed above, the central housing body 204 is affixed a lower trailing portion of the cabin roof 202, while the wing sections 212 of the rear module housing 204 extend along an upper edge of the rear window 232 of the tractor cabin 200 at an elevation beneath the cabin roof 202. The wing sections 212 further terminate in the enlarged end portions 216, which house the laterally-looking EDP devices 214 (e.g., stereo camera pairs), as previously described; noting that enlarged end portions 216, and therefore the EDP devices 214 contained therein, are located beneath the trailing edge portions of the tractor roof 202 and extend slightly forward relative to the rear window 232 of the tractor cabin 200 such that the rear perception module 46 wraps partially around the trailing peripheral edge of the tractor cabin 200. By virtue of this structural mounting scheme, the rear perception module 198 provides nominal obstruction of operator sightlines through the rear cabin window 232, while affording the EDP devices 214 elevated sightlines sightlines over and around various implements or machines that may be towed by the tractor 194 at different junctures in time. This enables the EDP devices 214 (e.g., the stereoscopic camera assemblies) can be optimally positioned about the upper trailing edge portion of the tractor cabin 200 to achieve a relatively wide angle cumulative FOV (e.g., a rearward-centered FOV approaching or exceeding 180°, while minimizing structural adaptions or modifications required to integrate the rear perception module 46 into existing tractor (or other work vehicle) cabin designs.

Figure 13:
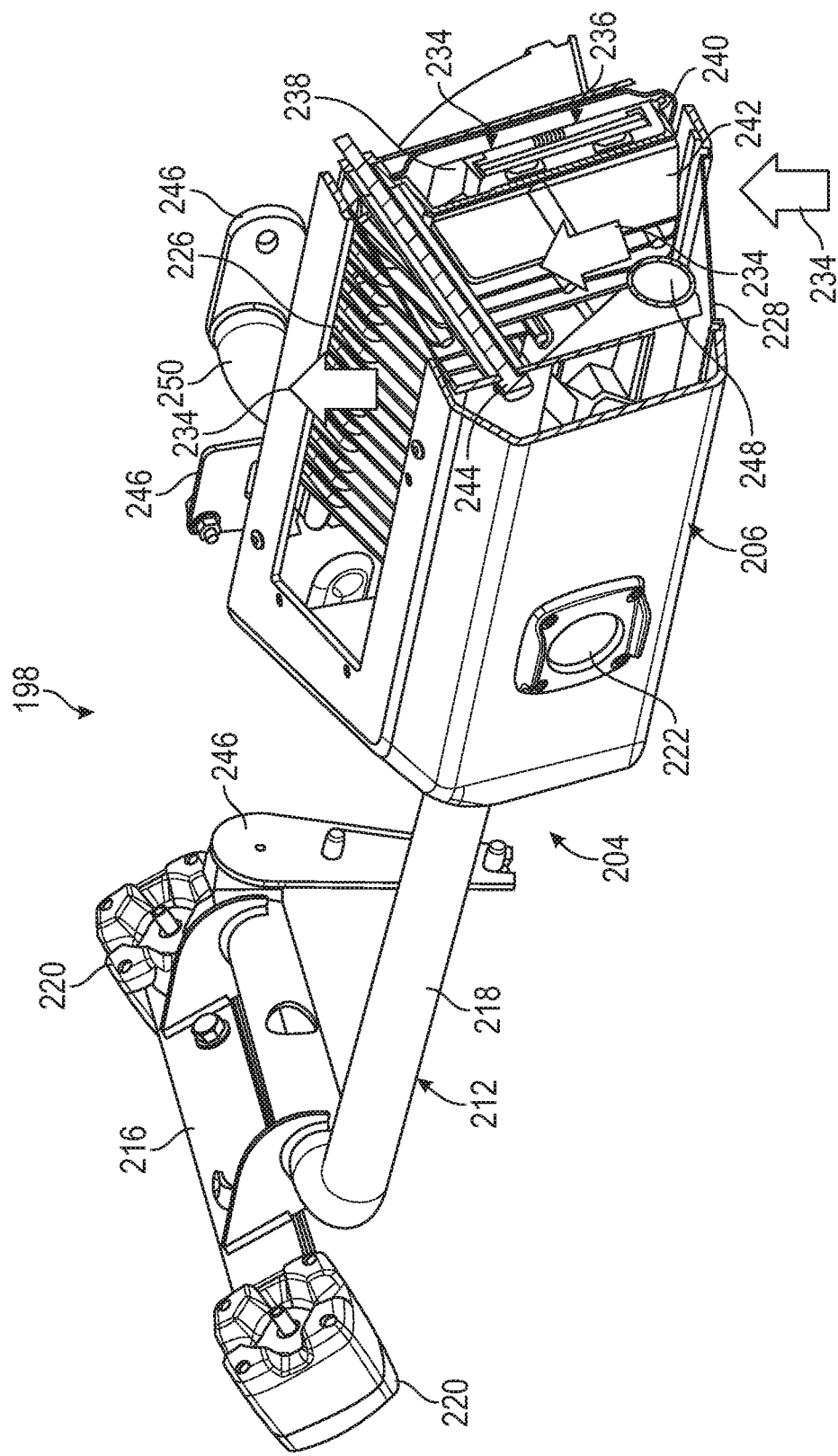
FIG. 13 is a cross-sectional view of the rear perception module shown in FIGS. 11 and 12 illustrating an example positioning and angled orientation of a VPU assembly (or similar heat-generating electronic component) within the central housing section of the perception module in a manner promoting passive cooling, while reducing trapped contaminants within the cooling fin array of the VPU assembly.

Referring lastly to FIG. 13, a cross-sectional view of the rear perception module 198, as taken along section plane bisecting the central housing body 204, is presented. In this view, the location of certain heat-generating electronics 224, and in particular the positioning and orientation of a VPU assembly 236, within the central housing body 204 of the perception module 198 can be seen. The example VPU assembly 236 includes a populated circuit board 238 (e.g., a motherboard to which at least one IC die, SMDs, or other microelectronic components are mounted), a surrounding housing or casing 240, and a cooling fin array 242. The VPU assembly 236 is generally positioned between the lower inlet vent 228 and the upper outlet vent 226, which are formed through upper and lower walls of the central housing body 204, respectively. The cooling fin array 242 of the VPU assembly 236 may include one or more rows of parallel-extending fins composed of a thermally-conductive material, such as a copper alloy, an aluminum alloy, or another metal or alloy; the term "cooling fin array," as appearing herein, generally encompassing any arrangement of fin-like structure or projections for convectively transferring heat to the ambient environment, regardless of the geometry of the fins within the cooling fin array 242 and including pin-fin type arrays. The VPU assembly 236 may be elongated in a lateral or width-wise direction, although the particular formfactor and dimensioning of the VPU assembly 236 will vary in other embodiments. In illustrated embodiment, specifically, the cooling fin array 242 may span at least half, if not the substantial entirety of the width of the central housing body 204 to maximize the surface area of the cooling fin array 242 availed for convective heat transfer to the ambient environment.

Embodiments of the rear perception module 198 may include various additional structural features or components for facilitating mounting of the module 198 to the cabin 200 of the tractor 194 (or other work vehicle), for routing cabling or wiring utilized for power and signal transmission, and for performing other such functions. For example, as further shown in FIG. 13, such features can include any number of bolts 244 for securing the VPU assembly 236 within the central housing body 206 and other mounting features 246 for installing the rear perception module 198 onto an upper rear portion of the tractor cabin 200, as previously described in connection with FIGS. 11 and 12. Internal and external conduits 248, 250 may also be provided for routing wiring or cabling between the electronic components (e.g., the VPU assembly 236 and the EDP devices 214) housed within the rear perception module 198 and providing electrical interconnections with electronics onboard the tractor 194. The present example notwithstanding, the construction and internal features of the rear perception module 198, and the particular manner in which the rear perception module 198 is mounted to the cabin of a tractor or other work vehicle, may vary in alternative implementations.

The VPU assembly 236 of the rear perception module 198 is advantageously mounted within the central housing body 204 to insert the cooling fin array 242 into one or more cooling airflow paths extending through the central housing body 204 in, for example, a generally vertical direction. For example, as indicated in FIG. 13, the VPU assembly 236 may be mounted within the central housing body 204 to insert the cooling fin array 242 into a cooling airflow path 234, which extends from the bottomside inlet vent 228 to the topside outlet vent 226 in a generally vertical direction and which receives airflow conducted in a generally upward direction alongside the rear window 232 of the tractor cabin 200. Additionally, the VPU assembly 236 may be further mounted in a rearwardly-facing orientation such that the cooling fin array 242 projects into the vertically-extending cooling airflow path 234, while generally extending in a direction away from the PCB or motherboard 238 and, more generally, from the rear window 232 of the tractor cabin 200. Concurrently, the VPU assembly 236 may be gently angled or slightly tilted in downward direction; e.g., such that the upper edge of the cooling fin array 242 protrudes over or projects beyond the lower edge of the cooling fin array 242, as taken along a vertical plane extending substantially parallel to the rear window 232 of the tractor cabin 200.

As just described, the VPU assembly 236 may be mounted within the central housing body 204 of the rear perception module 198 in a rear-facing and downwardly-tilted orientation in embodiments, while further being positioned such that the cooling fin array 242 projects into the cooling airflow path 234 extending vertically through the housing body 204. Mounting the VPU assembly 236 within the rear perception module 198 with such an orientation provides a number of benefit. As a general benefit, orienting the VPU assembly 236 in this manner the degree to which the central housing body 204 projects from the tractor cabin 200 in a rearward direction to be minimized to reduce visual obstruction of operator sightlines through the rear cabin window 232. Additionally, providing the VPU assembly 236 with such a position and orientation relative to the cooling airflow path 234 may boost the thermal performance of the cooling fin array 242 by increasing the duration of contact between the cooling fin array 242 and the cooling airflow conducted vertically through the central housing body 206 along the cooling airflow path 234. As a further benefit, imparting the VPU assembly 236 with such an orientation reduces the susceptibility of the cooling fin array 242 to the accumulation of airborne debris or other particulate matter build-up over the outer surfaces of the fin array 242, with gravitational forces and vibratory forces occurring during operation of the tractor 194 tending to dislodge any such particulate build-up from the fin array 242. Generally, then, the orientation, positioning, and sizing of the VPU assembly 236, and particularly the cooling fin array 242 of the VPU assembly 236, within the central housing body 204 in the above-described manner optimizes the heat dissipation capabilities and thermal performance of the VPU assembly 236; while allowing the VPU assembly 236 to maintain high thermal performance levels over time and, in many instances, without reliance on internal fans, liquid coolant systems, or other active cooling componentry. The overall cost and complexity of the rear perception module 198 is reduced as a result, while the durability and reliability of the perception module 198 is increased.

Enumerated Examples of the Work Vehicle Perception System and Rear Perception Modules Examples of the front perception module, the rear perception module, and the work vehicle perception system are further provided and numbered for ease of reference.

1. A rear perception module is utilized in conjunction with a work vehicle having a work vehicle cabin and a cabin roof. In an embodiment, the rear perception module includes an environmental depth perception (EDP) sensor system including a first EDP device having a field of view (FOV) encompassing an environmental region to a rear of the work vehicle, a rear module housing mounted to an upper trailing edge portion of the cabin roof, and vents formed in exterior walls of the rear module housing to facilitate airflow through the rear module housing along a cooling airflow path. A heat-generating electronic component is electrically coupled to the first EDP device and positioned in or adjacent the cooling airflow path such that excess heat generated by the heat-generating electronic component is dissipated by convective transfer to airflow conducted along the cooling airflow path during operation of the rear perception module.

2. The rear perception module of example 1, wherein the first EDP device assumes the form of a stereoscopic camera assembly, while the heat-generating electronic component includes or assumes the form of visual processing circuitry electrically coupled to the stereoscopic camera assembly.

3. The rear perception module of example 1, wherein the heat-generating electronic component comprises a visual processing unit (VPU) assembly having cooling fin array. The VPU assembly is mounted within the rear module housing such that, when the rear perception module is mounted to the work vehicle cabin, the cooling fin array extends away from the work vehicle cabin and into the cooling airflow path.

4. The rear perception module of example 1, wherein the rear module housing includes a rear protruding section projecting in a rearward direction relative to the work vehicle cabin, the heat-generating electronic component at least partially located in the rear protruding section.

5. The rear perception module of example 4, wherein the vents include an outlet vent formed in an upper wall of the rear protruding section and an inlet vent formed in a lower wall of the rear protruding section. The inlet vent is oriented to receive airflow conducted in a generally upward direction alongside the rear window of the work vehicle cabin.

6. The rear perception module of example 1, wherein the vents include an inlet vent formed in a raised leading surface of the rear module housing, which projects upwardly from the cabin roof and oriented to intake ram airflow as the work vehicle travels in a forward direction.

7. The rear perception module of example 1, wherein the rear module housing includes a central housing body in which the heat-generating electronic component is located, a first wing section extending from the central housing body in a first lateral direction, and a second wing section extending from the central housing body in a second lateral direction opposite the first lateral direction.

8. The rear perception module of example 7, wherein the first wing section terminates adjacent a first corner region of the cabin roof, while the second wing section terminates adjacent a second corner region of the cabin roof laterally opposite the first corner region.

9. The rear perception module of example 8, wherein the first wing section and the second wing section each include an enlarged terminal end extending in a forward direction relative to a rear window of the work vehicle cabin such that the rear module housing wraps around a trailing upper edge portion of the work vehicle cabin.

10. The rear perception module of example 7, wherein the first EDP device has a line of sight (LOS) extending through one or more apertures provided in a rear-facing wall of the central housing body.

11. The rear perception module of example 10, further including a second EDP device having an LOS extending through one or more apertures provided in an outer terminal wall of the first wing section, as well as a third EDP device having an LOS extending through one or more apertures provided in an outer terminal wall of the second wing section.

12. The rear perception module of example 11, wherein the first, second, and third EDP devices assume the form of first, second, and third stereoscopic camera assemblies, respectively.

13. The rear perception module of example 11, wherein the first, second, and third EDP devices are distributed to provide a cumulative rear-centered FOV equal to or greater than 180 degrees, as seen looking downwardly onto the work vehicle.

14. Embodiments of a work vehicle equipped with a rear perception module are further disclosed. In an example embodiment, the work vehicle includes a work vehicle cabin and a cabin roof, which has a first trailing corner region, a second trailing corner region, and a central trailing edge region between the first trailing corner region and the second trailing corner region. The rear perception module includes, in turn, a rear module housing mounted to the cabin roof, a first laterally-looking stereoscopic camera assembly contained in the rear module housing and positioned adjacent the first trailing corner region of the cabin roof, a second laterally-looking stereoscopic camera assembly contained in the rear module housing and positioned adjacent the second trailing corner region of the cabin roof, and a rearwardly-looking stereoscopic camera assembly contained in the rear module housing and positioned adjacent the central trailing edge region of the cabin roof.

15. The work vehicle of example 14, wherein the rear module housing includes, a central housing body containing the rearwardly-looking stereoscopic camera assembly, a first wing section containing the first laterally-looking stereoscopic camera assembly and extending from the central housing body in a first lateral direction, and a second wing section containing the second laterally-looking stereoscopic camera assembly and extending from the central housing body in a second lateral direction opposite the first lateral direction.

CONCLUSION

The foregoing has thus provided front and rear work vehicle perception modules providing various advantages, including thermal performance and structural integration benefits, as well as to work vehicle perception systems containing such modules. Embodiments of the front perception module may be joined to the laterally-extending hanger bracket of a front ballast system to provide a rigid attachment to the work vehicle chassis minimizing disturbances forces transmitted the EDP devices (e.g., stereoscopic camera assemblies) contained in EDP sensor system. Additionally, mounting of the front perception module in this manner may provide mechanical protection benefits, particularly as the leading and side edges of the front module housing may be recessed relative to the corresponding edges of the front ballast system. Similarly, mounting or integration of the rear perception module into the rear edge portion of the cabin roof provides various mechanical protection and LOS benefits. Both the front and rear perception modules may further include vent features promoting airflow through the front module housing along cooling airflow paths as the work vehicle remains stationary or travels in a forward direction. This may enhance convective cooling of heat-generating electronic components, such as VPUs or other visual processing circuitry, in embodiments of the perception modules to optimize EDP sensor system perform. Further, VPU or other heat-generating electronic assemblies including cooling fin arrays may be advantageously mounted within the perception module housings in tilted orientations, such as a rear-facing, downwardly-tilted orientation, inserting the fin arrays into cooling airflow paths, while optimizing module housing formfactor and minimizing the build-up of airborne debris or other particulate matter over the cooling fin arrays.

As an additional benefit, embodiments of the front and rear perception modules may enable relatively broad or expansive sensor coverage of the environment surrounding a tractor or other work vehicle. In this regard, embodiments of the front perception module may be configured to provide a cumulative sensor FOV approaching or exceeding 180° by, for example, strategically positioning multiple (e.g., three) stereoscopic camera pairs (or other EDP devices). Concurrently, embodiments of the rear perception module support a spatial distribution of the stereoscopic camera assemblies (or other EDP devices) in a manner providing relatively broad, rear-centered FOV, again approaching or exceeding 180° in embodiments. The combination of the front and rear perception modules may thus achieve a cumulative FOV of approaching or substantially equal to 360°, thereby providing comprehensive sensor coverage of the environment surrounding the host work vehicle.

As used herein, the singular forms "a", "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A rear perception module utilized in conjunction with a work vehicle having a work vehicle cabin and a cabin roof, the rear perception module comprising:
   an environmental depth perception (EDP) sensor system comprising a first EDP device having a field of view (FOV) encompassing an environmental region to a rear of the work vehicle;
   a rear module housing mounted to an upper trailing edge portion of the cabin roof;
   vents formed in exterior walls of the rear module housing to facilitate airflow through the rear module housing along a cooling airflow path, the vents including an inlet vent at a rear of the rear module housing that is oriented to receive airflow conducted in a generally upward direction alongside the rear window of the work vehicle cabin and including an outlet vent at the rear of the rear module housing that is oriented to receive the airflow from the inlet vent; and
   a heat-generating electronic component electrically coupled to the first EDP device, the heat-generating electronic component positioned in or adjacent the cooling airflow path such that excess heat generated by the heat-generating electronic component is dissipated by convective transfer to airflow conducted along the cooling airflow path during operation of the rear perception module.

2. The rear perception module of claim 1, wherein the first EDP device comprises a stereoscopic camera assembly; and
   wherein the heat-generating electronic component comprises visual processing circuitry electrically coupled to the stereoscopic camera assembly.

3. The rear perception module of claim 1, wherein the heat-generating electronic component comprises a visual processing unit (VPU) assembly having a cooling fin array; and
   wherein the VPU assembly is mounted within the rear module housing such that, when the rear perception module is mounted to the work vehicle cabin, the cooling fin array extends away from the work vehicle cabin and into the cooling airflow path.

4. The rear perception module of claim 1, wherein the rear module housing comprises a rear protruding section projecting in a rearward direction relative to the work vehicle cabin, the heat-generating electronic component at least partially located in the rear protruding section.

5. The rear perception module of claim 4, wherein the outlet vent is formed in an upper wall of the rear protruding section and the inlet vent is formed in a lower wall of the rear protruding section.

6. The rear perception module of claim 1, wherein the vents further comprise an inlet vent formed in a raised leading surface of the rear module housing, the raised leading surface projecting upwardly from the cabin roof and oriented to intake ram airflow as the work vehicle travels in a forward direction.

7. The rear perception module of claim 1, wherein the rear module housing comprises:
 a central housing body in which the heat-generating electronic component is located;
 a first wing section extending from the central housing body in a first lateral direction; and
 a second wing section extending from the central housing body in a second lateral direction opposite the first lateral direction.

8. The rear perception module of claim 7, wherein the first wing section terminates adjacent a first corner region of the cabin roof, while the second wing section terminates adjacent a second corner region of the cabin roof laterally opposite the first corner region.

9. A rear perception module utilized in conjunction with a work vehicle having a work vehicle cabin and a cabin roof, the rear perception module comprising:
 an environmental depth perception (EDP) sensor system comprising a first EDP device having a field of view (FOV) encompassing an environmental region to a rear of the work vehicle;
 a rear module housing mounted to an upper trailing edge portion of the cabin roof, wherein the rear module housing comprises a central housing body in which the heat-generating electronic component is located, a first wing section extending from the central housing body in a first lateral direction, and a second wing section extending from the central housing body in a second lateral direction opposite the first lateral direction, wherein the first wing section and the second wing section each include an enlarged terminal end extending in a forward direction relative to a rear window of the work vehicle cabin such that the rear module housing wraps around a trailing upper edge portion of the work vehicle cabin;
 vents formed in exterior walls of the rear module housing to facilitate airflow through the rear module housing along a cooling airflow path; and
 a heat-generating electronic component electrically coupled to the first EDP device, the heat-generating electronic component positioned in or adjacent the cooling airflow path such that excess heat generated by the heat-generating electronic component is dissipated by convective transfer to airflow conducted along the cooling airflow path during operation of the rear perception module.

10. The rear perception module of claim 7, wherein the first EDP device has a line of sight (LOS) extending through one or more apertures provided in a rear-facing wall of the central housing body.

11. A rear perception module utilized in conjunction with a work vehicle having a work vehicle cabin and a cabin roof, the rear perception module comprising:
 an environmental depth perception (EDP) sensor system comprising a first EDP device having a field of view (FOV) encompassing an environmental region to a rear of the work vehicle;
 a rear module housing mounted to an upper trailing edge portion of the cabin roof, wherein the rear module housing comprises a central housing body in which the heat-generating electronic component is located, a first wing section extending from the central housing body in a first lateral direction, and a second wing section extending from the central housing body in a second lateral direction opposite the first lateral direction;
 vents formed in exterior walls of the rear module housing to facilitate airflow through the rear module housing along a cooling airflow path; and
 a heat-generating electronic component electrically coupled to the first EDP device, the heat-generating electronic component positioned in or adjacent the cooling airflow path such that excess heat generated by the heat-generating electronic component is dissipated by convective transfer to airflow conducted along the cooling airflow path during operation of the rear perception module;
 wherein the first EDP device has a line of sight (LOS) extending through one or more apertures provided in a rear-facing wall of the central housing body and wherein the EDP sensor system further includes a second EDP device having an LOS extending through one or more apertures provided in an outer terminal wall of the first wing section and a third EDP device having an LOS extending through one or more apertures provided in an outer terminal wall of the second wing section.

12. The rear perception module of claim 11, wherein the first, second, and third EDP devices comprise first, second, and third stereoscopic camera assemblies, respectively.

13. The rear perception module of claim 11, wherein the first, second, and third EDP devices are distributed to provide a cumulative rear-centered FOV equal to or greater than 180 degrees, as seen looking downwardly onto the work vehicle.

* * * * *